(12) United States Patent
Yushiya

(10) Patent No.: US 6,539,129 B1
(45) Date of Patent: *Mar. 25, 2003

(54) IMAGE READING APPARATUS HAVING PLURAL SENSORS ARRANGED ADJACENTLY IN A LINE

(75) Inventor: Akihiko Yushiya, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/605,955

(22) Filed: Feb. 23, 1996

(30) Foreign Application Priority Data

| Feb. 24, 1995 | (JP) | ............................................. 7-036945 |
| Mar. 1, 1995 | (JP) | ............................................. 7-041817 |
| Mar. 29, 1995 | (JP) | ............................................. 7-071625 |

(51) Int. Cl.[7] ............................... G06K 9/20; H04N 1/46
(52) U.S. Cl. ........................ 382/323; 382/312; 358/505
(58) Field of Search ................................. 382/312, 313, 382/314, 315, 316, 317, 318, 319, 321, 322, 323, 324; 250/200, 208.1, 200.6; 358/505, 509, 513, 514, 474

(56) References Cited

U.S. PATENT DOCUMENTS

| 4,424,590 A | * | 1/1984 | Ozawa ........................ 382/324 |
| 4,434,503 A | * | 2/1984 | Tanaka et al. ................. 382/48 |
| 4,691,114 A | * | 9/1987 | Hasegawa et al. ........... 250/578 |
| 4,734,787 A | * | 3/1988 | Hayashi ....................... 358/293 |
| 4,750,048 A | * | 6/1988 | Satoh et al. ................. 382/312 |
| 4,899,226 A | * | 2/1990 | Tanimoto et al. ............ 358/451 |
| 5,898,510 A | * | 4/1999 | Kaihotsu et al. ............. 358/509 |

FOREIGN PATENT DOCUMENTS

JP  58-114668  7/1983

* cited by examiner

Primary Examiner—Andrew W. Johns
Assistant Examiner—Duy M Dang
(74) Attorney, Agent, or Firm—Fitzpatrick, Cella, Harper & Scinto

(57) ABSTRACT

An image reading apparatus includes: a plurality of line sensors for converting pickup light into image signals, the line sensors being arranged adjacently in a line; a first signal line for inputting driving signals for driving the plurality of line sensors; and second signal lines for outputting the image signals from the plurality of line sensors. The second signal lines are independently connected respectively to the plurality of line sensors. Switching means simultaneously drive the plurality of line sensors by the driving signals and output the image signals from the line sensors in parallel.

21 Claims, 18 Drawing Sheets

FIG. 1 - PRIOR ART
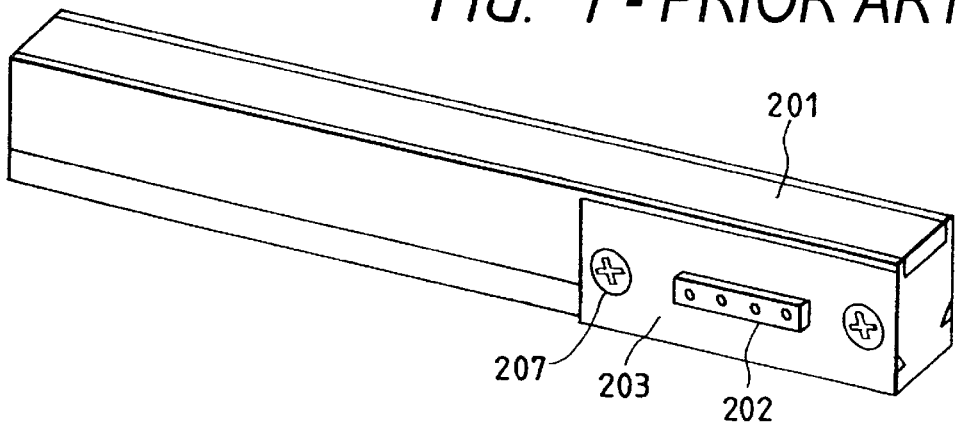
FIG. 2 - PRIOR ART
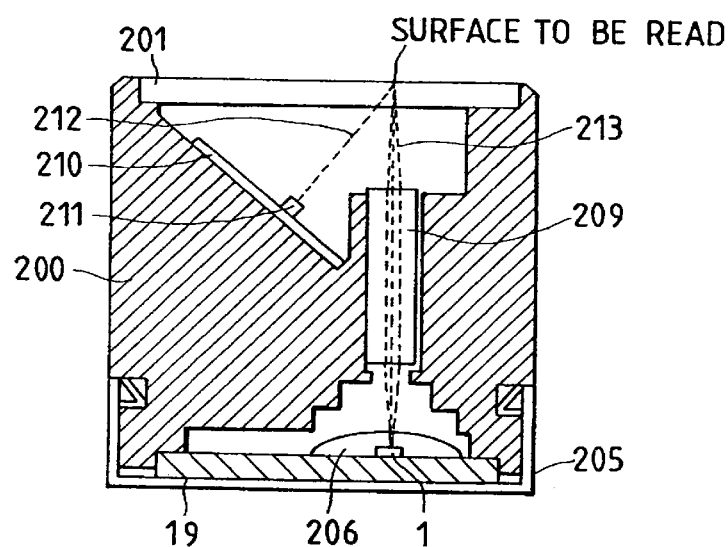
FIG. 3 - PRIOR ART
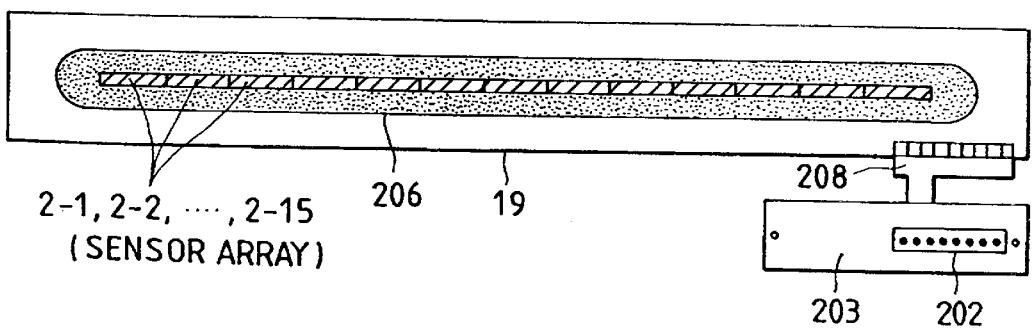

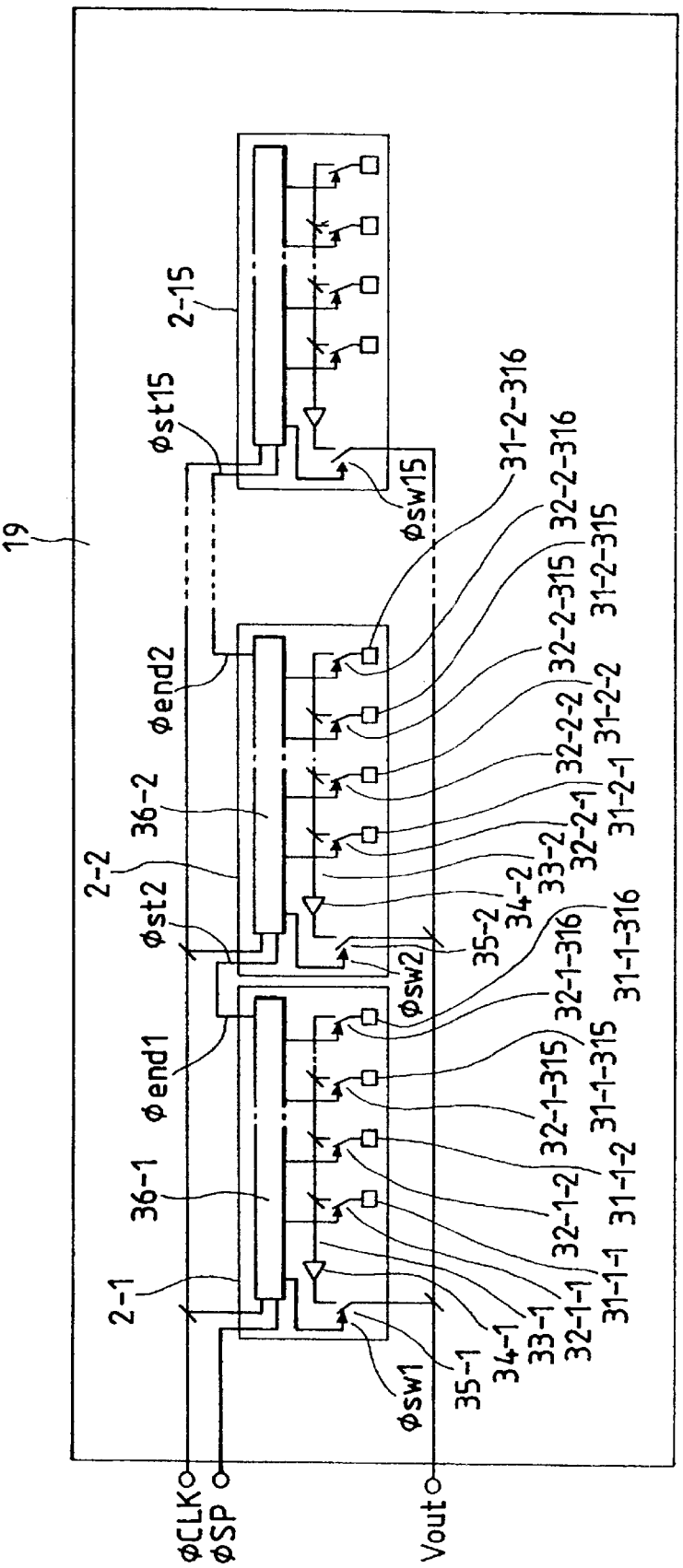
FIG. 4 - PRIOR ART

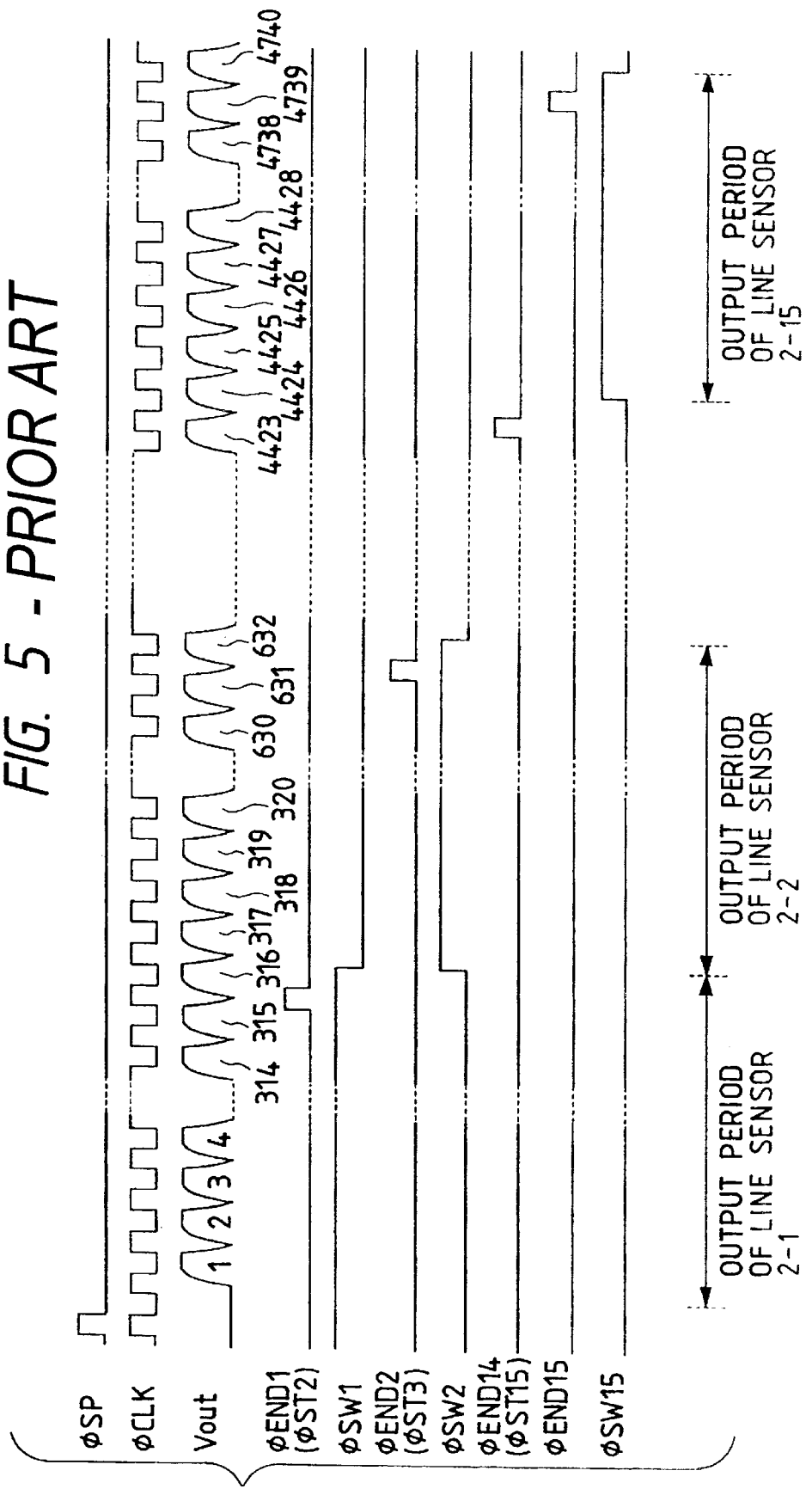
FIG. 5 - PRIOR ART

IMAGE READING APPARATUS HAVING PLURAL SENSORS ARRANGED ADJACENTLY IN A LINE

BACKGROUND OF THE INVENTION

1. Field of the Invention

The invention relates to an image reading apparatus which is used for, for example, a scanner, a facsimile, or the like.

2. Related Background Art

Hitherto, as one of image reading apparatuses, a contact type multi-chip image sensor constructed by a light source, a short focal point image pickup element array, and a plurality of line sensors is known. FIGS. 1 to 3 show an example of such an image reading apparatus. A transparent glass plate 201 which is in contact with an original surface is attached onto the upper surface of a frame 200. An emission light 212 of an LED 211 attached onto an LED board 210 provided in the frame 200 is reflected by the original surface which is in contact with the upper surface of the transparent glass plate 201. An optical system 209 for transmitting a reflection light 213 from the original surface to be read and a sensor array 1 provided on a board 19 in correspondence to the optical system 209 are provided in the frame 200. As an optical system, the foregoing short focal point image pickup element array represented by, for example, "Cellhock lens array (trade name)" (made by Nippon Sheet Glass Co., Ltd.) is used.

As shown in FIG. 3, the sensor array 1 is constructed by arranging a plurality of line sensors 2-1, 2-2, . . . , and 2-15 in a line on the board 19 and is covered with a protecting film 206. In the contact type multi-chip image sensor, since the reflection light from the original is formed as an image onto the sensor array at an equal magnification and is read in principle, a length of sensor array 1 needs to be set to a value corresponding to only the width of original to be read.

Therefore, the necessary length of sensor array 1 changes depending on the size of original to be read and the number of line sensors constructing the sensor array 1 also changes. The case of reading the original of the A3 size will now be considered as an example. Assuming that a length of one line sensor is equal to 20 mm, it is sufficient to construct the sensor array by 15 line sensors.

The board 19 is supported onto a bottom plate 205 which is in engagement with the frame 200 and is connected to a flexible board 203 through a flexible wiring 208. A connector 202 for input and output of a power source, a control signal, and the like is provided on the flexible board 203 and is attached to the frame 200 by a screw 207.

The operation of the contact type multi-chip image sensor will now be described with reference to FIG. 4 showing wirings on the board and FIG. 5 showing a timing chart. The operations of the plurality of line sensors 2-1, 2-2, . . . , and 2-15 arranged in a line on the board 19 are started by a start pulse $\phi$SP and a shift register 36-1 starts the operation. Now, assuming that the number of photosensitive (pixel) elements arranged in each line sensor is equal to 316, the shift register 36-1 which started the operation generates signals for sequentially making switches 32-1-1, 32-1-2, . . . , and 32-1-316 conductive, thereby allowing the signals accumulated in photosensitive elements 31-1-1, 31-1-2, . . . , and 31-1-316 to be transferred to an output line 33-1. While the reading operation of the line sensor 2-1 is being performed, a switch 35-1 is conducting by a control signal $\phi$sw1, so that the signals transferred to the output line 33-1 are transmitted through a buffer amplifier 34-1 to a common output terminal Vout on the board 19.

An output signal $\phi$end1 at the final stage of the shift register 36-1 in the line sensor 2-1 is connected by the wiring on the board 19 and becomes a start pulse $\phi$st2 of the line sensor 2-2. After completion of the reading of the signal of the line sensor 2-1, the reading operation of the line sensor 2-2 is started. In a manner similar to the line sensor 2-1, a shift register 36-2 starts the operation and sequentially makes switches 32-2-1, 32-2-2, . . . , and 32-2-316 conductive, thereby allowing signals accumulated in photosensitive elements 31-2-1, 31-2-2, . . . , and 31-2-316 to be transferred to an output line 33-2.

While the reading operation of the line sensor 2-2 is being performed, a switch 35-2 is conducting by a control signal $\phi$sw2, thereby allowing the signals transferred to the output line 33-2 to be transmitted to the common output terminal Vout through a buffer amplifier 34-2.

Similarly, an output signal $\phi$end2 at the final stage of the shift register 36-2 in the line sensor 2-2 is connected by the wiring on the board 19 and becomes a start pulse $\phi$st3 of the line sensor 2-3. The reading operation of the line sensor 2-3 is executed subsequent to the line sensor 2-2. In a manner similar to the above, signals of the line sensors 2-4 to 2-15 are also sequentially read out by a similar procedure.

As mentioned above, the sensor array 1 constructed by a plurality of line sensors 2-1, 2-2, . . . , and 2-15 functions as one image sensor and sequentially generates the signals of all of the photosensitive elements to the common output terminal Vout.

After completion of the reading of the image data of one line, the contact type multi-chip image sensor is moved in the sub scanning direction (direction perpendicular to the arranging direction of the plurality of line sensors) by a distance corresponding to one line and reads the next line. By repeating the above operation a number of times corresponding to the original size, an image of the entire original is completely read out by using the contact type multi-chip image sensor.

In the above conventional apparatus, however, since the signals of all of the sensor chips are sequentially outputted to one output line, it takes a time to obtain the signals of one line. Although a request such that the user wants to read the original in a short time is increasing more and more in recent years, if the user tries to output the signal at a high speed in such a construction, the circuit to read out the signals from the photosensitive elements, buffer amplifiers, and the like have to be constructed so as to cope with a further higher band, thereby causing complication of a circuit construction and a manufacturing process. This inevitably results in an increase in costs and becomes a large problem, on the other hand, since the reduction of the costs is also an important object. Further, the realization of the high output speed in the conventional apparatus also causes a problem such that not only does the complexity of the circuit design increase but the number of development elements, such as analog signal processes of the generated signals and the like, increase also so that development time increases.

SUMMARY OF THE INVENTION

An object of the invention is to provide an image reading apparatus which can read an image at a high quality in a short time.

Another object of the invention is to provide an image reading apparatus which can read an image at a high quality and at a high speed.

Still another object of the invention is to provide an image reading apparatus which can read an image at a high quality by means of a simple construction.

Yet another object of the invention is to provide an image reading apparatus which can read an image at a high quality and with low cost.

To accomplish the above objects, according to an embodiment of the invention, there is provided an image reading apparatus in which a plurality of line sensors each for converting an image pickup light into an electric signal are arranged in the longitudinal direction, comprising: driving means for driving the plurality of line sensors; and switching means for switching a first operation to simultaneously drive the plurality of line sensors by the driving means and to output signals of the line sensors in parallel and a second operation to sequentially drive the plurality of line sensors by said driving means and to sequentially output the signals of the line sensors.

With this construction, the image reading apparatus which can output the signals by a simple construction can be provided.

According to another embodiment of the invention, there is provided an image reading apparatus in which a plurality of line sensors each for converting an image pickup light into an electric signal are arranged in the longitudinal direction, comprising: driving means for driving the plurality of line sensors by a same frequency; and control means for controlling so that a drive timing of at least one of the plurality of line sensors by the driving means is shifted from drive timings of the other line sensors by a predetermined period shorter than a reading period from photosensitive elements on the line sensor.

With the above construction, an image reading apparatus having low cost and high performance in which the signals of the line sensors can be outputted at a high speed by a simple construction can be provided.

According to yet another embodiment of the invention, there is provided an image reading apparatus in which a plurality of line sensors each for converting an image pickup light into an electric signal are arranged in the longitudinal direction, comprising: driving means for driving the plurality of line sensors; memory means for storing output signals of the plurality of line sensors driven by the driving means; and control means for controlling so as to simultaneously execute a writing operation of a signal into a first memory area in the memory means and a reading operation of a signal from a second memory area different from the first memory area.

With the above construction, an image reading apparatus which can perform the image reading operation in a short time without realizing a high output speed in the line sensor can be provided.

The above and other objects and features of the present invention will become apparent from the following detailed description and the appended claims with reference to the accompanying drawings.

BRIEF DESCRIPTION OF THE DRAWINGS

FIG. 1 is an external view of a contact type multi-chip image sensor;

FIG. 2 is a cross sectional view of the contact type multi-chip image sensor;

FIG. 3 is an external view of a sensor board of the contact type multi-chip image sensor;

FIG. 4 is a constructional diagram of a conventional sensor board;

FIG. 5 is a conventional timing chart for reading an image;

DETAILED DESCRIPTION OF THE PREFERRED EMBODIMENTS

Figure 6:
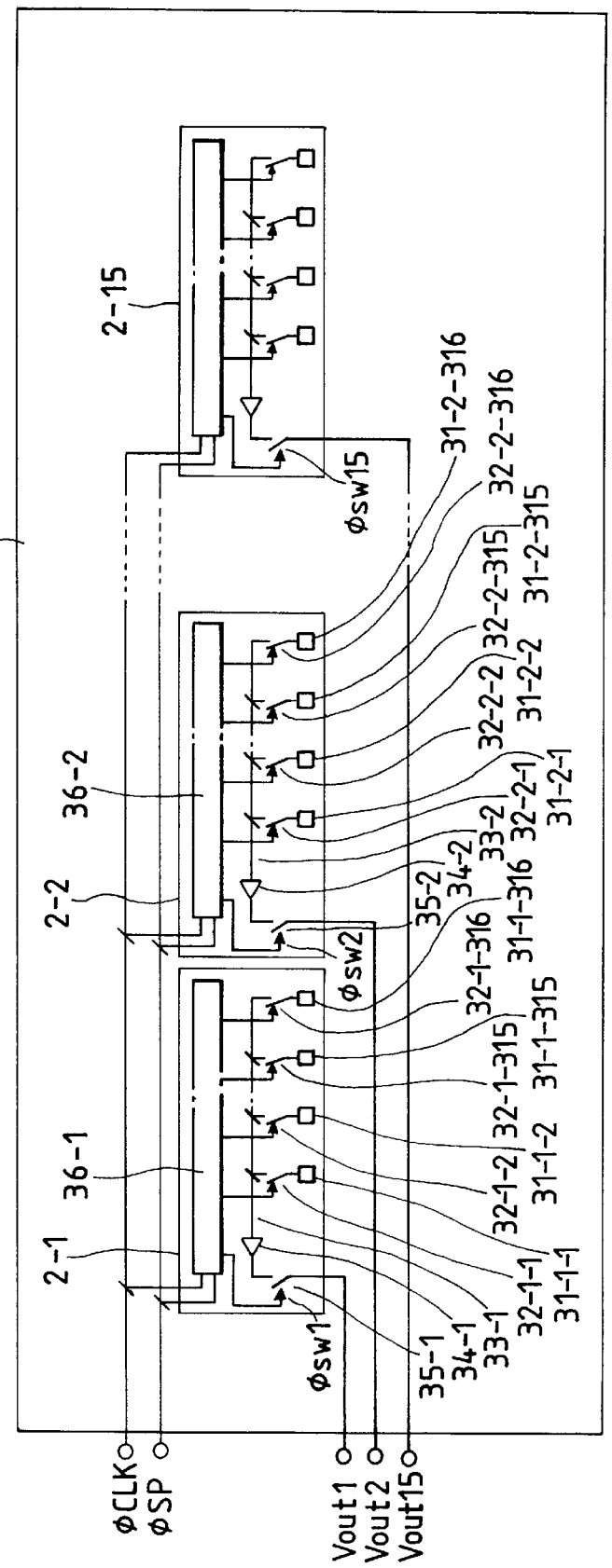
FIG. 6 is a constructional diagram of a sensor board according to the first embodiment.

FIG. 6 is a diagram showing wirings of a board 39 on which the sensor array 1 is installed in a contact type multi-chip image sensor according to the first embodiment of the invention. In the diagram, reference numerals 2-1, 2-2, . . . , and 2-15 denote substantially the same line sensors as those in the conventional image sensor. However, the wirings on the board 39 attached with the sensor array 1 are different from the wirings on the board 19 in the conventional image sensor in FIG. 4 and the line sensors are simultaneously driven and their signal outputs can be independently extracted.

Specifically speaking, a start pulse φSP to start the operation of each line sensor is directly inputted to all of the line sensors 2-1, 2-2, . . . , and 2-15. Output terminals Vout1 to Vout15 as many as the number of line sensors are also prepared on the board 39 in order to connect the signal outputs of the line sensors and are connected to output terminals of line sensors.

Figure 7:
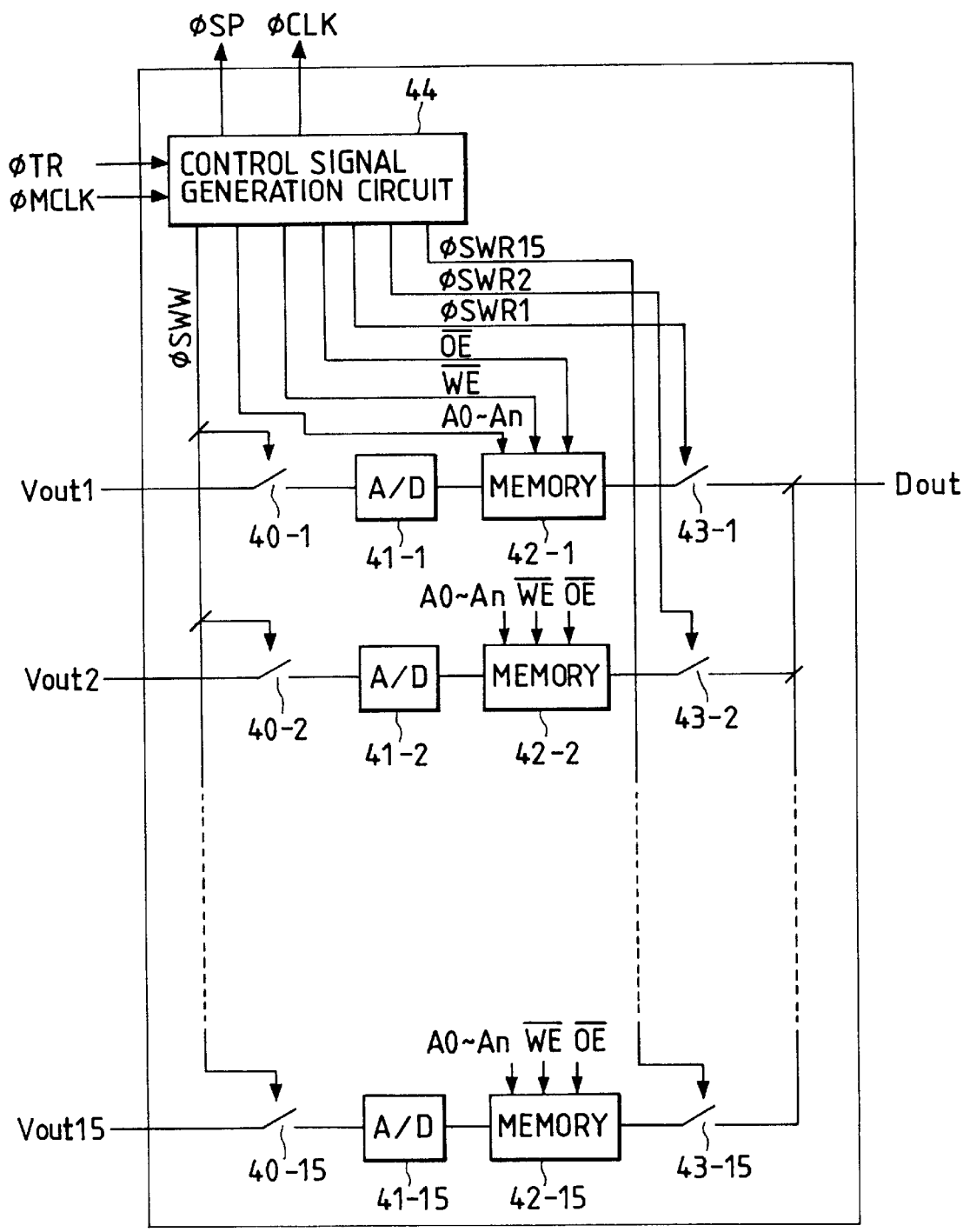
FIG. 7 is a constructional diagram of a digital output circuit in the first embodiment.

A digital signal output circuit which is connected to the output terminals Vout1 to Vout15 of the board 39 is constructed as shown in FIG. 7. In the diagram, reference numerals 41-1, 41-2, . . . , and 41-15 denote A/D converters for converting the analog signals supplied to the output terminals Vout1 to Vout15 into the digital signals; 40-1, 40-2, . . . , and 40-15 switches for controlling the connections between the output terminals Vout1 to Vout15 and the A/D converters 41-1, 41-2, . . . , and 41-15; φSWW a control signal to control the on/off operations of the switches 40-1, 40-2, . . . , and 40-15; 42-1, 42-2, . . . , and 42-15 memories for temporarily holding the digital signals converted; A0 to An control signals serving as address signals to give addresses of the digital data to be read or written to the memories; $\overline{WE}$ a control signal serving as a write enable signal to give a timing to write the data into the memories; $\overline{OE}$ a control signal serving as an output enable signal to give a timing to read out the data from the memories; 43-1, 43-2, ..., and 43-15 switches for controlling connections between outputs of the memories and a common output terminal Dout; φSWR1 to φSWR15 control signals for controlling the on/off operations of the switches 43-1, 43-2, ..., and 43-15; and 44 a control signal generation circuit serving as driving means for generating each of the control signals from an original reading operation start signal φTR and a master clock pulse φMCLK.

Figure 8:
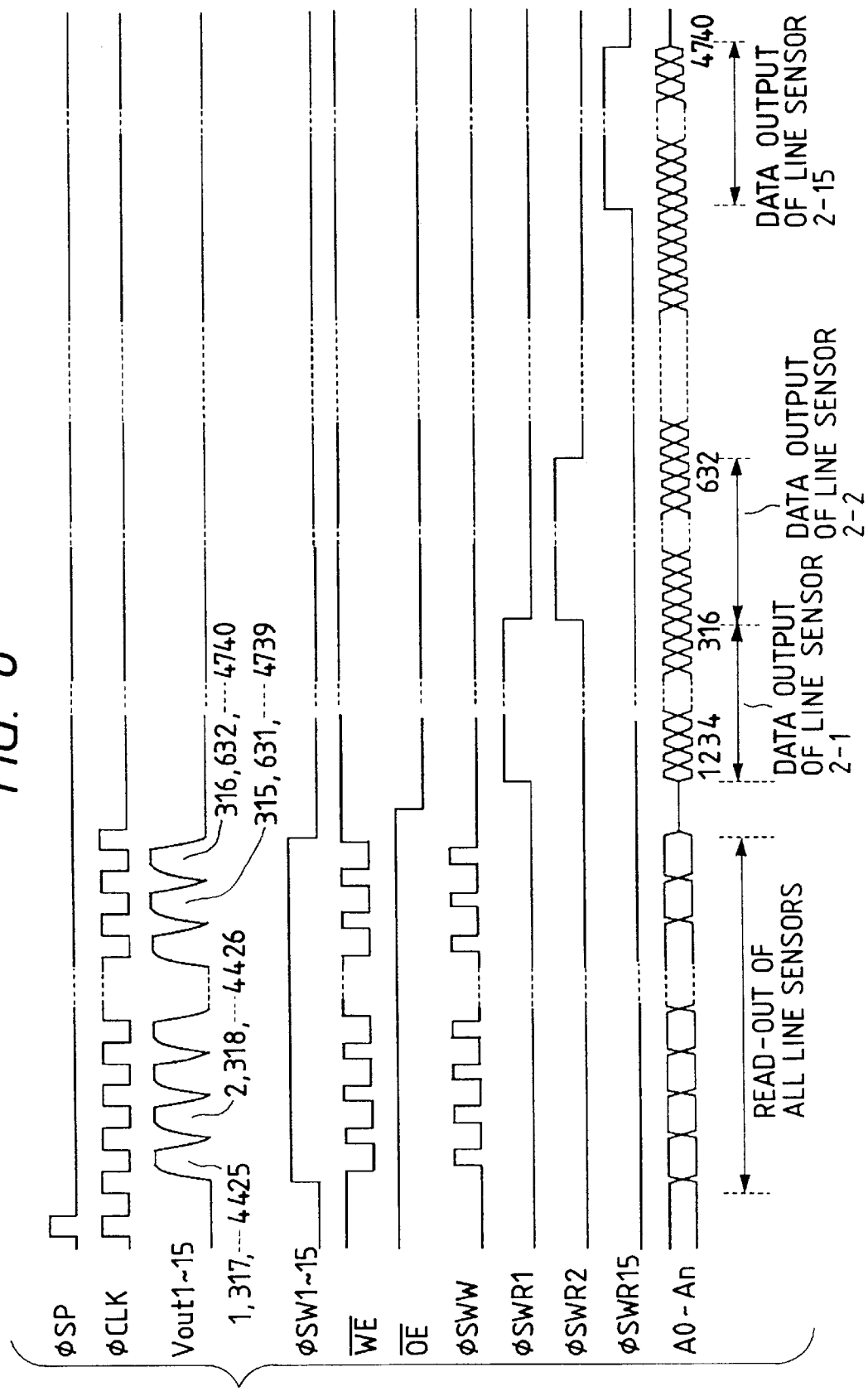
FIG. 8 is a timing chart for reading an image in the first embodiment.

The operation of the contact type multi-chip image sensor in the invention in which the wirings on the board are changed as shown in FIG. 6 and the digital signal output circuit in FIG. 7 is connected will now be described with reference to a timing chart of FIG. 8.

First, all of the line sensors 2-1, 2-2, ..., and 2-15 simultaneously start the operations by the start pulse φSP, and the switches 35-1, 35-2, ..., and 35-15 at the output stages in the line sensors 2-1, 2-2, ..., and 2-15 are conducting for a period of time during which the line sensors 2-1, 2-2, ..., and 2-15 generate the signals by control signals φsw1, φsw2, ..., and φsw15. Thus, the line sensors sequentially output the signals accumulated in the photosensitive elements to the output terminals Vout1 to Vout15, respectively.

First, the signal of the photosensitive element which generates the signal for the first time in each line sensor, namely, the signals of the 1st, 317th, ..., and 4425th photosensitive elements on the sensor array 1 are simultaneously outputted to the output terminals Vout1 to Vout15. Subsequently, the signals of the 2nd, 318th, ..., and 4426th photosensitive elements are outputted to the output terminals Vout1 to Vout15. In a manner similar to the above, the signals of the photosensitive elements in the sensor chips are sequentially read out. Finally, the signals of the 316th, 632nd, ..., and 4740th photosensitive elements are read out. The reading operations of the signals from the photosensitive elements of all of the line sensors are completed for the reading time of just one chip.

For a period of time during which the signals of all of the line sensors are being read out, in the digital signal output circuit shown in FIG. 7, the signals outputted to the output terminals Vout1 to Vout15 are connected to the A/D converters 41-1, 41-2, ..., and 41-15 at timings when the signals of the photosensitive elements have sufficiently been read out by the on/off operations of the switches 40-1, 40-2, ..., and 40-15, respectively. The A/D converted signals of the photosensitive elements are temporarily held in the memories 42-1, 42-2, ..., and 42-15 as memory means by the address signals A0 to An and write enable signal $\overline{WE}$.

As mentioned above, simultaneously with that the signals of all of the line sensors are read out, the signals of all of the photosensitive elements on the sensor array 1 are stored into the memories 42-1, 42-2, ..., and 42-15 every line sensor.

After completion of the reading operations of the signals of all of the line sensors, the reading operations from the memories are started.

First, after the reading operations from the memories were enabled by the output enable signal $\overline{OE}$, only the switch 43-1 as selecting means is made conductive by the control signal φSWR1 and only the output terminal of the memory 42-1 is connected to the digital output terminal Dout. At this time, the address signal is changed at a predetermined timing and the data stored in the memory 42-1 is sequentially read out. The signals of the photosensitive elements of the line sensor 2-1 held in the memory 42-1 are read out as digital signals at a high speed.

Subsequently, the memory 42-1 is disconnected from the digital output terminal Dout by the control signal φSWR1. The memory 42-2 is connected to the digital output terminal Dout by the control signal φSWR2. By changing the address signal at a predetermined timing in a manner similar to the memory 42-1, the data stored in the memory 42-2 is sequentially read out.

Further, in a manner similar to the above, the data in the memories 42-3, ..., and 42-15 is sequentially read out as digital signals to the digital output terminal Dout at a high speed in accordance with the same order as the arrangement of the photosensitive elements in the sensor array 1.

As mentioned above, by using the image sensor which can sequentially read out the outputs of the line sensors, the parallel outputs of the line sensors generated onto the board are read into the memories by the digital signal output circuit in the conventional reading time corresponding to one chip and are extracted as digital signals from the memory at high speed, so that the signal reading operation of the sensor array can be performed in a short time.

In the embodiment, the outputs of the line sensors extracted in parallel are sampled and A/D converted at the same timing, so that unevenness does not occur among the output levels of the line sensors. In recent years, the costs of the contact type multi-chip image sensor are decreasing more and more and necessity to use cheap parts is increasing. However, there is also an advantage such that even if the clock pulse or the like leaks onto the output line on the board, by sampling the analog signal by a different circuit, the operation is hardly influenced, so that a cheap board can be used.

Figure 9:
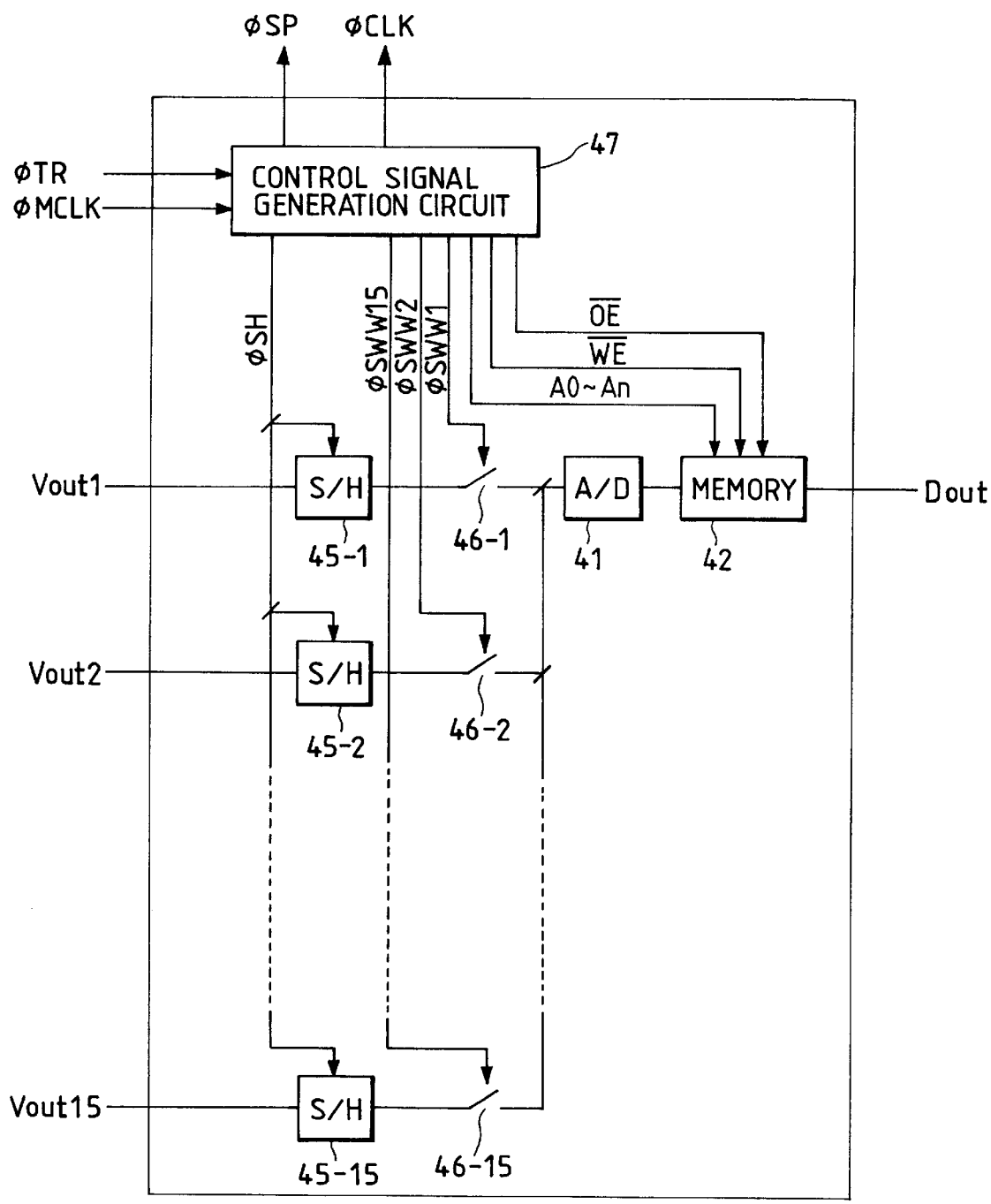
FIG. 9 is a constructional diagram of a digital output circuit according to the second embodiment.

FIG. 9 is a diagram showing a construction of a digital signal output circuit according to the second embodiment of the invention. In the diagram, reference numerals 45-1, 45-2, ..., and 45-15 denote sample and hold circuits as holding means for sampling and holding the analog signals outputted to the output terminals Vout1 to Vout15 on the board 39 at a predetermined timing; φSH a control signal to decide the timing to sampling and holding; 46-1, 46-2, ..., and 46-15 switches as selecting means for controlling connections between the analog signals which were sampled and held and the A/D converters 41-1, 41-2, ..., and 41-15; φSWW1 a signal to control the on/off operation of the switch 46-1; φSWW2 a signal to control the on/off operation of the switch 46-2; φSWW15 a signal to control the on/off operation of the switch 46-15; and 47 a control signal generation circuit as driving means for generating the control signals from the original reading operation start signal φTR and master clock pulse φMCLK.

Figure 10:
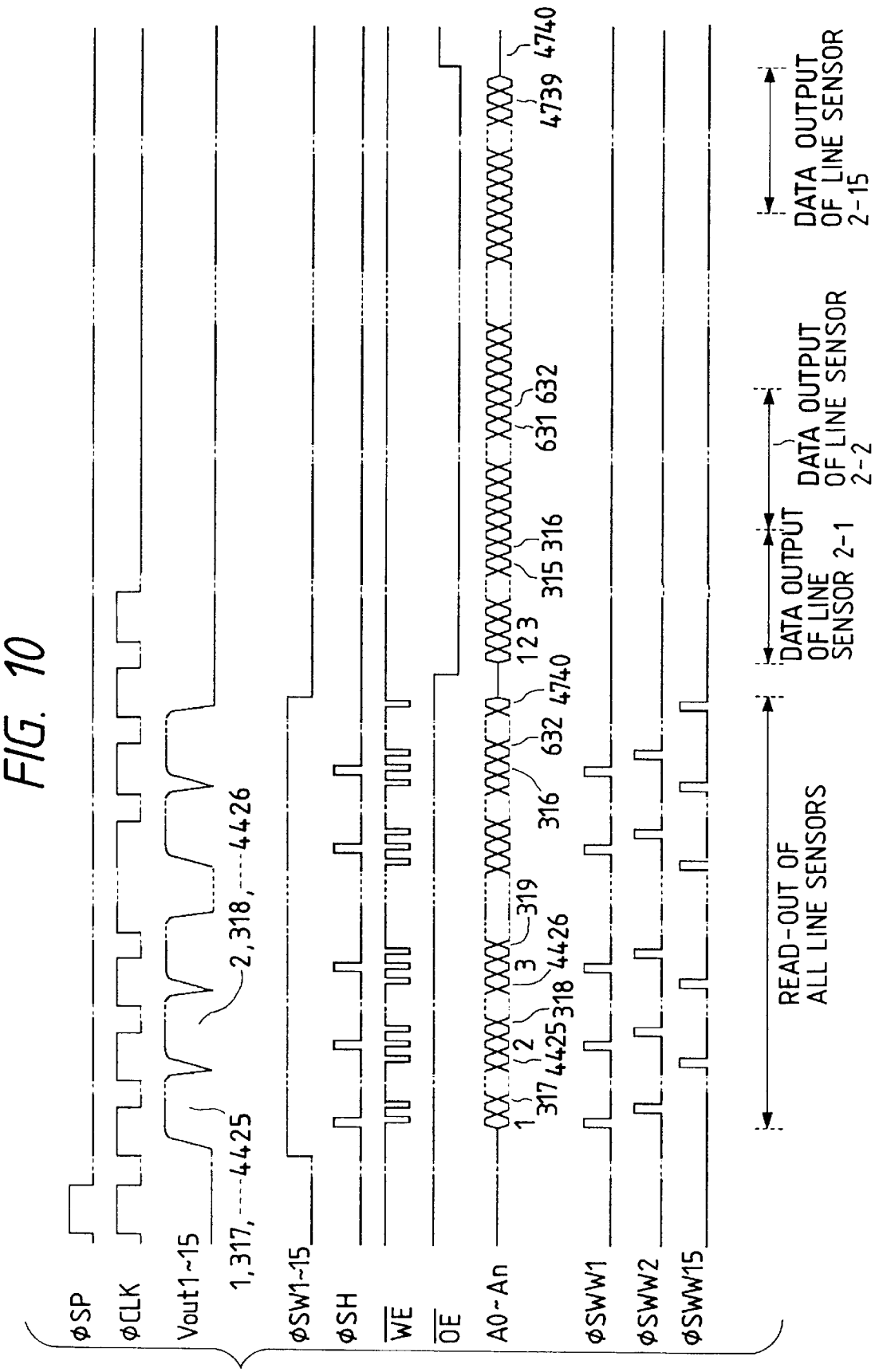
FIG. 10 is a timing chart for reading an image in the second embodiment.

The operation of the contact type multi-chip image sensor in which the output terminals Vout1 to Vout15 on the board 39 in FIG. 6 are connected to the digital signal output circuit in FIG. 9 will now be described with reference to a timing chart of FIG. 10.

In a manner similar to the first embodiment, first, all of the line sensors 2-1, 2-2, ..., and 2-15 simultaneously start the operations by the start pulse φSP, the switches 35-1, 35-2, ..., and 35-15 at the output stages in the line sensors 2-1, 2-2, ..., and 2-15 are conducting for a period of time during which the line sensors 2-1, 2-2, ..., and 2-15 generate the signals by control signals φsw1, φsw2, ..., and φsw15. Thus, the line sensors sequentially output the signals accumulated in the photosensitive elements to the output terminals Vout1 to Vout15, respectively.

First, the signal of the photosensitive element which generates the signal for the first time in each line sensor, namely, the signals of the 1st, 317th, ..., and 4425th photosensitive elements on the sensor array 1 are simultaneously outputted to the output terminals Vout1 to Vout15. Subsequently, the signals of the 2nd, 318th, ..., and 4426th photosensitive elements are outputted to the output terminals Vout1 to Vout15. In a manner similar to the above, the signals of the photosensitive elements in the line sensors are sequentially read out. Finally, the signals of the 316th, 632nd, ..., and 4740th photosensitive elements are read out. The reading operations of the signals of the photosensitive elements of all of the line sensors are completed for the reading time of just one chip.

For a period of time during while the signals of all of the line sensors are being read out, in the digital signal output circuit shown in FIG. 9, the analog signals outputted to the output terminals Vout1 to Vout15 are simultaneously sampled and held by the sample and hold signal φSH. Subsequently, only an output of the S/H circuit 45-1 is inputted to an A/D converter 41 by the switch 46-1. The corresponding digital signal is written into predetermined addresses in a memory 42 as memory means shown by the address signals A0 to An by the write enable signal $\overline{WE}$.

Subsequently, only an output of the S/H circuit 45-2 is inputted to the A/D converter 41 by the switch 46-2. The corresponding digital signal is written into predetermined addresses in the memory 42 shown by the address signals A0 to An by the write enable signal $\overline{WE}$. Subsequently, outputs of the S/H circuits 45-3 to 45-15 are inputted one by one to the A/D converter 41. The corresponding digital signals are written into predetermined addresses in the memory 42 shown by the address signals A0 to An by the write enable signal $\overline{WE}$. In this manner, in the period of time during which the signals of the photosensitive elements which generate the signals for the first time of the respective line sensors are being read out to the output terminals Vout1 to Vout15, the signals of the 1st, 317th, and 4425th photosensitive elements on the sensor array 1 which were outputted to the output terminals Vout1 to Vout15 are sequentially converted into the digital signals by one A/D converter and can be written into the predetermined addresses in the memories.

Subsequently, the signals of the second photosensitive elements of the line sensors 2-1, 2-2, ..., and 2-15, namely, the 2nd, 318th, ..., and 4426th photosensitive elements on the sensor array 1 are respectively outputted to the output terminals Vout1 to Vout15, so that the signals of the second photosensitive elements of the line sensors 2-1, 2-2, ..., and 2-15 are also sequentially converted into the digital signals by one A/D converter and are written into the predetermined addresses in the memories.

In a manner similar to the above, the signals corresponding to the photosensitive elements in the respective line sensors are sequentially read out and converted into the digital signals. After that, they are written into the memories. Finally, the signals corresponding to the 316th, 632nd, ..., and 4740th photosensitive elements in the respective line sensors are read out. The reading operations of all of the photosensitive elements of the line sensors are completed and the corresponding digital signals are shifted into the memories. In this instance, so long as an A/D converting speed of the A/D converter 41 and a writing speed of the memory 42 are high enough the signals of all of the photosensitive elements of the sensor array 1 can be read out in the reading time corresponding to just one chip in a manner similar to the first embodiment.

After completion of the reading operations of the signals of all of the photosensitive elements, the reading operation of the digital signal stored in the memory 42 is started by the output enable signal $\overline{OE}$. An output terminal of the memory 42 is directly connected to the common digital output terminal Dout here. By switching the address signals A0 to An at a proper timing, the digital signals corresponding to the photosensitive elements on the sensor array 1 can be sequentially read out at a high speed onto the sensor array 1 in accordance with the arranging order.

The parallel outputs of the line sensors outputted onto the board by using the image sensor which can sequentially read out the outputs of the line sensors as mentioned above are sampled and held. In the reading period of time of one photosensitive element, the outputs corresponding to 15 chips are switched and A/D converted and the digital signals obtained are written into the memory. Thus, the processes for the outputs of 15 chips can be performed by the A/D converter and memory of one system and a circuit scale of the digital signal output circuit can be reduced. In the embodiment 2 as well, by extracting the signals as digital signals from the memory at a high speed, the signals of the sensor array can be read out in a short time in a manner similar to the embodiment 1. Even in the embodiment, since the outputs of the sensor chips which were extracted in parallel are sampled at the same timing and A/D converted, there is also an advantage such that unevenness does not occur among the output levels of the line sensors and a cheap board can be used.

Figure 11:
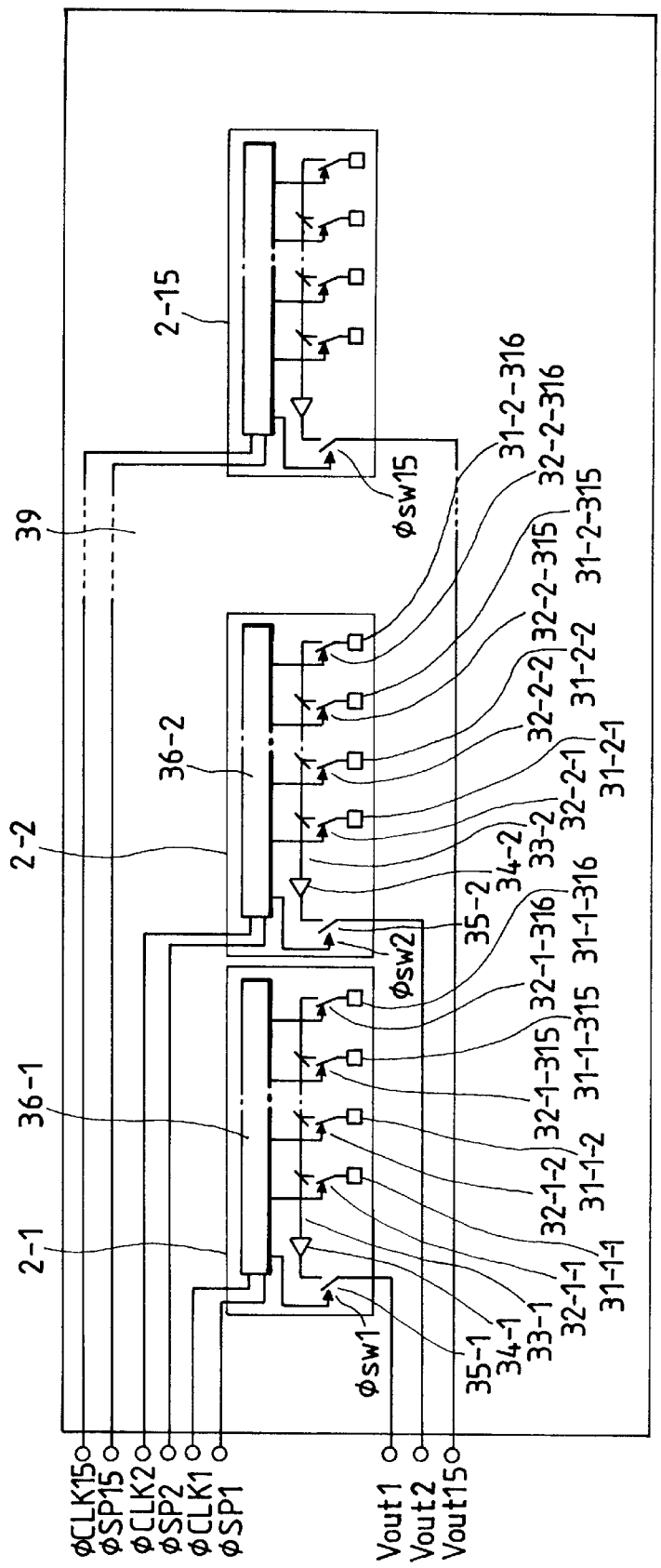
FIG. 11 is a constructional diagram of a sensor board according to the third embodiment.

FIG. 11 is a diagram showing most preferably a feature of the third embodiment and shows wirings of the board 39 on which a sensor array in a contact type multi-chip image sensor as an image reading apparatus is installed. In the diagram, the line sensors 2-1, 2-2, ..., and 2-15 are substantially the same as those in the conventional apparatus. However, wirings on the board 39 attached with the sensor array 1 are different from the wirings on the board 19 of the conventional apparatus shown in FIG. 4. The line sensors are independently driven and the signal outputs can be extracted to output lines which are used only for the line sensors, respectively.

Specifically speaking, start pulses φSP1 to φSP15 to start the operations of the line sensors and clock pulses φCLK1 to φCLK15 to drive the line sensors are directly inputted to all of the line sensors 2-1, 2-2, ..., and 2-15. The output terminals Vout1 to Vout15 as many as the number of line sensors are also prepared on the board 39 connecting the signal outputs of the line sensors and are connected to the output terminals of the line sensors, respectively.

Figure 12:
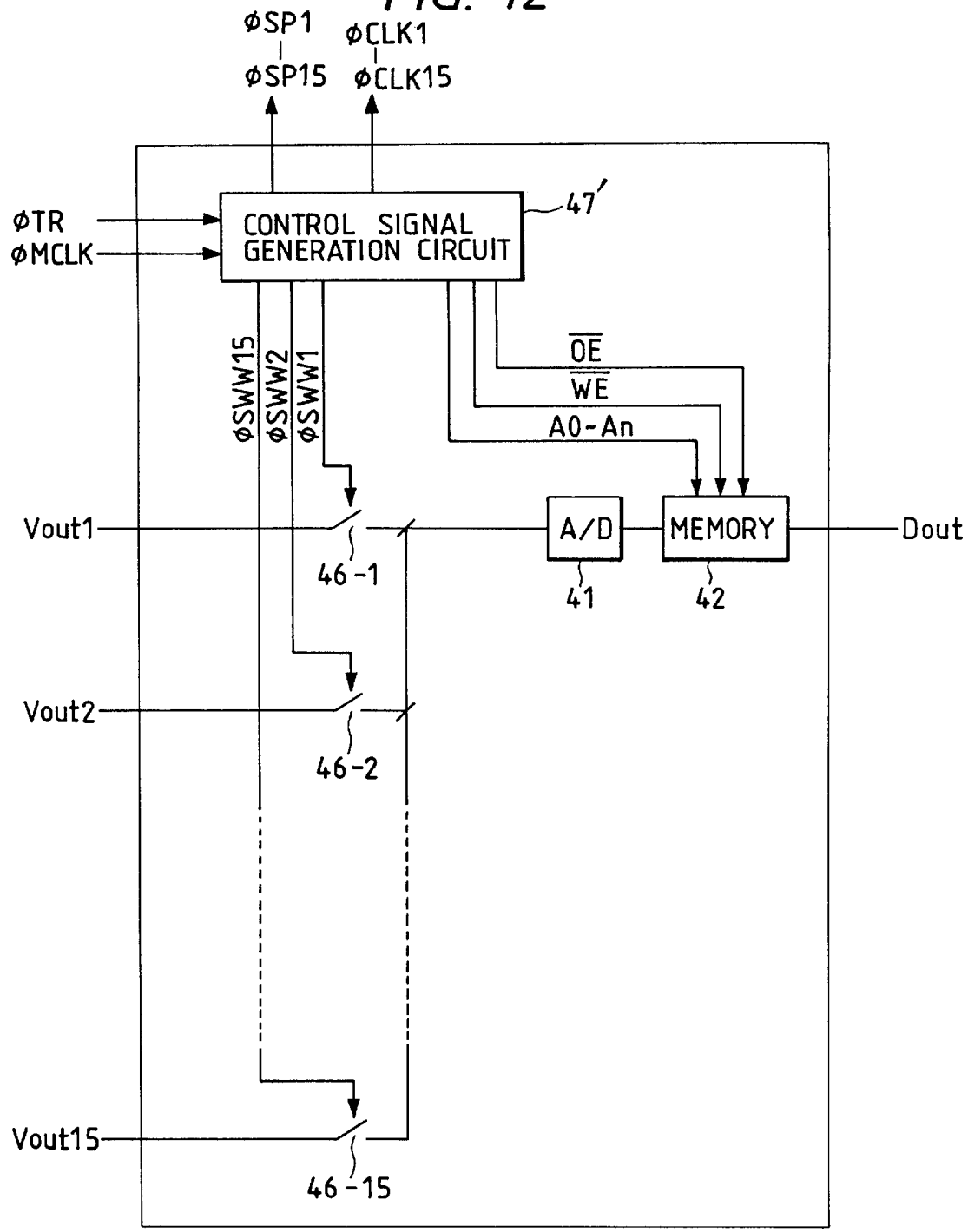
FIG. 12 is a constructional diagram of a digital output circuit in the third embodiment.

A digital signal output circuit which is connected to the output terminals Vout1 to Vout15 of the board 39 is constructed as shown in FIG. 12. In the diagram, reference numeral 41 denotes the A/D converter for converting the analog signals outputted to the output terminals Vout1 to Vout15 into the digital signals; 46-1, 46-2, ..., and 46-15 the switches for controlling the connections between the output terminals Vout1 to Vout15 of the line sensors and the A/D converter 41; φSWW1 to φSWW15 the control signals to control the on/off operations of the switches 46-1, 46-2, ..., and 46-15; 42 the memory to temporarily hold the signals converted into the digital signals; A0 to An the control signals serving as address signals to give the addresses of the digital data to be read or written to the memory; $\overline{WE}$ the control signal serving as a write enable signal to give the timing to write the data into the memory; $\overline{OE}$ the control signal serving as an output enable signal to give the timing to read out the data from the memory; Dout the digital output terminal connected to the memory output; and 47' the control signal generation circuit serving as driving means and control means for generating the control signals from the reading operation start signal φTR and master clock pulse φMCLK.

Figure 13:
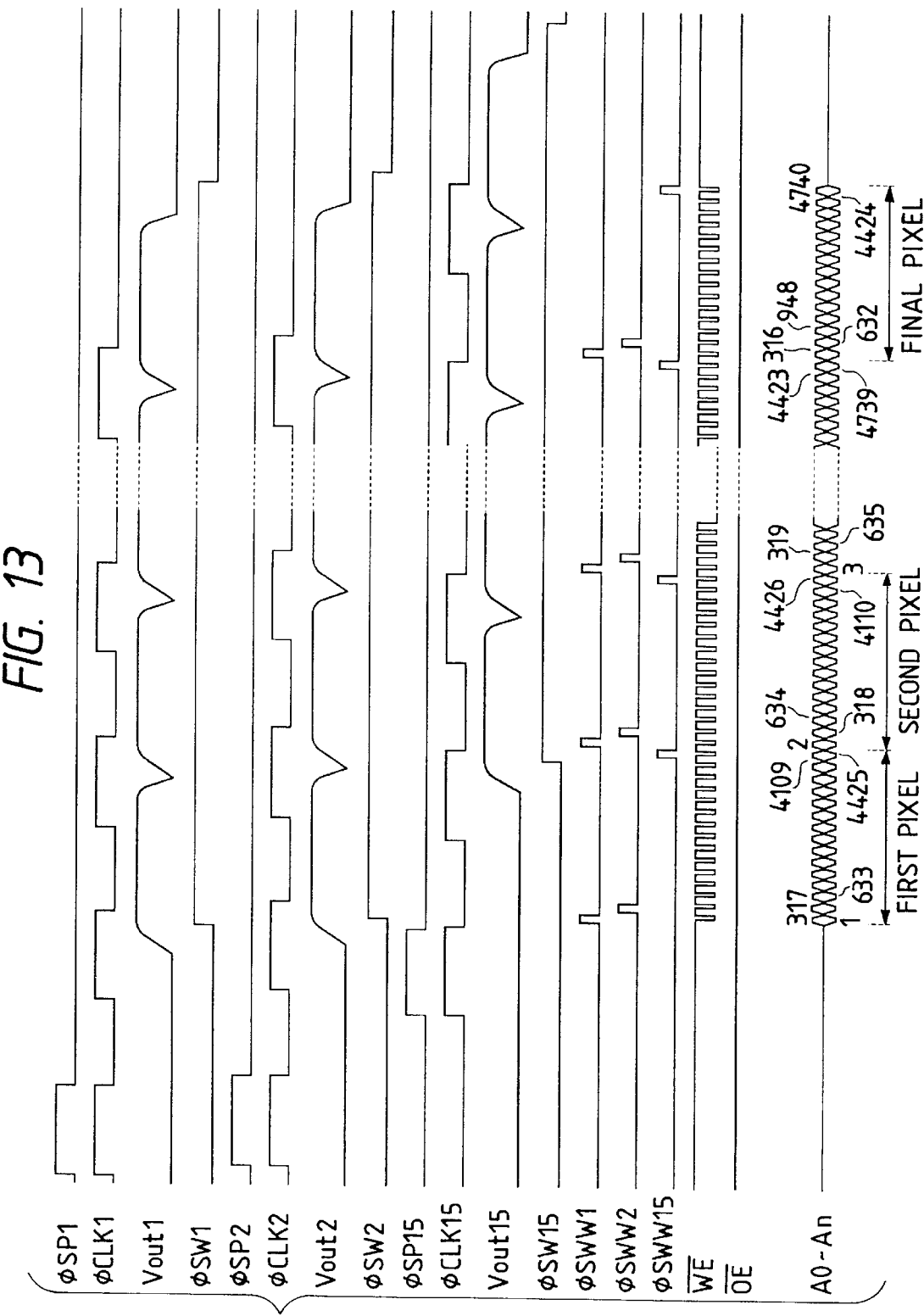
FIG. 13 is a timing chart for reading an image in the third embodiment.

The operation of the contact type multi-chip image sensor in the invention in which the digital signal output circuit of FIG. 12 is connected to the output lines Vout1 to Vout15 on the board attached with the sensor array 1 shown in FIG. 11 will now be described. Namely, the writing operation from each line sensor to the memory 41 will be explained with reference to a timing chart of FIG. 13. The reading operation from the memory 41 to the digital output terminal Dout will be explained with reference to a timing chart of FIG. 14.

First, since the line sensor 2-1 starts the operation by the start pulse φSP1 and the switch 35-1 at the output stage in the line sensor 2-1 is conducting by the control signal φsw1 for a period of time during which the line sensor 2-1 is generating the signal, the signals accumulated in the photosensitive elements are sequentially outputted to the output terminal Vout1. The line sensor 2-2 starts the operation at a timing that is delayed by only a predetermined time from the line sensor 2-1 by the start pulse φSP2 which is delayed by only a predetermined time from the start pulse φSP1 and the clock pulse φCLK2 which is delayed by only the same time as the time mentioned above from the clock pulse φCLK1. The switch 35-2 at the output stage in the line sensor 2-2 also starts to be made conductive with a delay of only a predetermined time from the operation of the switch 35-1. Since the switch 35-2 is also conducting for a period of time during which the line sensor 2-2 is generating the signal, the signals accumulated in the photosensitive elements are sequentially outputted to the output terminal Vout2.

In a manner similar to the above, the line sensor 2-3 starts the operation with a delay of only a predetermined time from the operation of the line sensor 2-2. The signals accumulated in the photosensitive elements are sequentially outputted to the output terminal Vout3. In a manner similar to the above, each of the line sensors 2-4 to 2-15 also starts the operation with the same delay time, so that the signals accumulated in the photosensitive elements are sequentially outputted to the output terminals Vout4 to Vout15, respectively.

As mentioned above, the signals of the first photosensitive elements of the respective line sensors, namely, the 1st, 317th, . . . , and 4425th photosensitive elements on the sensor array 1 are outputted to the output terminals Vout1 to Vout15 at the timings which are respectively delayed by only every predetermined time and are outputted. In this instance, by setting the delay time between the outputs of the line sensors to a time which is obtained by equally dividing the time which is required for each line sensor to read out the signal from one photosensitive element by the number of line sensors, the signal of the second photosensitive element of the line sensor 2-1 is outputted with the same delay time from the output of the first photosensitive element of the line sensor 2-15. Therefore, subsequent to the signals of the 1st, 317th, . . . , and 4425th photosensitive elements on the sensor array 1, the signals of the 2nd, 318th, . . . , and 4426th photosensitive elements on the sensor array 1 are sequentially shifted by only every predetermined time and are outputted to the output terminals Vout1 to Vout15. In a manner similar to the above, the signals of the photosensitive elements in each line sensor are delayed by only a predetermined time and are transmitted to the output terminals Vout1 to Vout15. Finally, the signals of the 316th, 632nd, . . . , and 4740th photosensitive elements are read out. The reading operations of the signals of all of the photosensitive elements of all of the line sensors are completed in almost the reading time of one chip.

While the signals of all of the line sensors are being read but, in the digital signal output circuit shown in FIG. 12, the signals outputted to Vout1 to Vout15 are shifted by only every predetermined time for each line sensor. The switches 46-1, 46-2, . . . , and 46-15 are sequentially turned on or off one by one and are connected to the A/D converter 41. The A/D converted signals of the photosensitive elements are temporarily held in the memory 42 by the address signals A0 to An and write enable signal $\overline{WE}$.

In this manner, simultaneously with that the signals of all of the line sensors have been read out, the signals of all of the photosensitive elements on the sensor array 1 are stored into the memory 42.

After completion of the reading operations of the signals of all of the line sensors, the reading operation from the memory is started.

First, after the reading operation from the memory was enabled by the output enable signal $\overline{OE}$, the address signals are changed at a predetermined timing and the data stored in the memory 42 is sequentially extracted as digital signals one by one at a high speed in accordance with the arrangement order of the photosensitive elements on the sensor array.

In this manner, a plurality of line sensors are driven while shifting the phases by only the time obtained by equally dividing the reading time of one photosensitive element by the number of line sensors. The outputs of the line sensors which were outputted onto the board are respectively phase shifted in correspondence to the driving of the line sensors and are sequentially A/D converted one by one. After that, by sequentially writing the A/D converted signals into the memory, the signals of all of the photosensitive elements on the sensor array can be read out in almost the reading time of one chip in the conventional apparatus by using the A/D converter and memory of one system. By extracting the read signals as digital signals from the memory at a high speed, the reading and outputting operations of the signals of the sensor array can be performed totally in a short time.

In the third embodiment, since the delay time of the operation between the line sensors is equal to the delay time of the timing for A/D converting the output between the line sensors, the output analog signal of each line sensor is A/D converted at the same timing as that of the clock pulse which is inputted to each line sensor, so that no unevenness occurs among the output levels of the line sensors.

Figure 15:
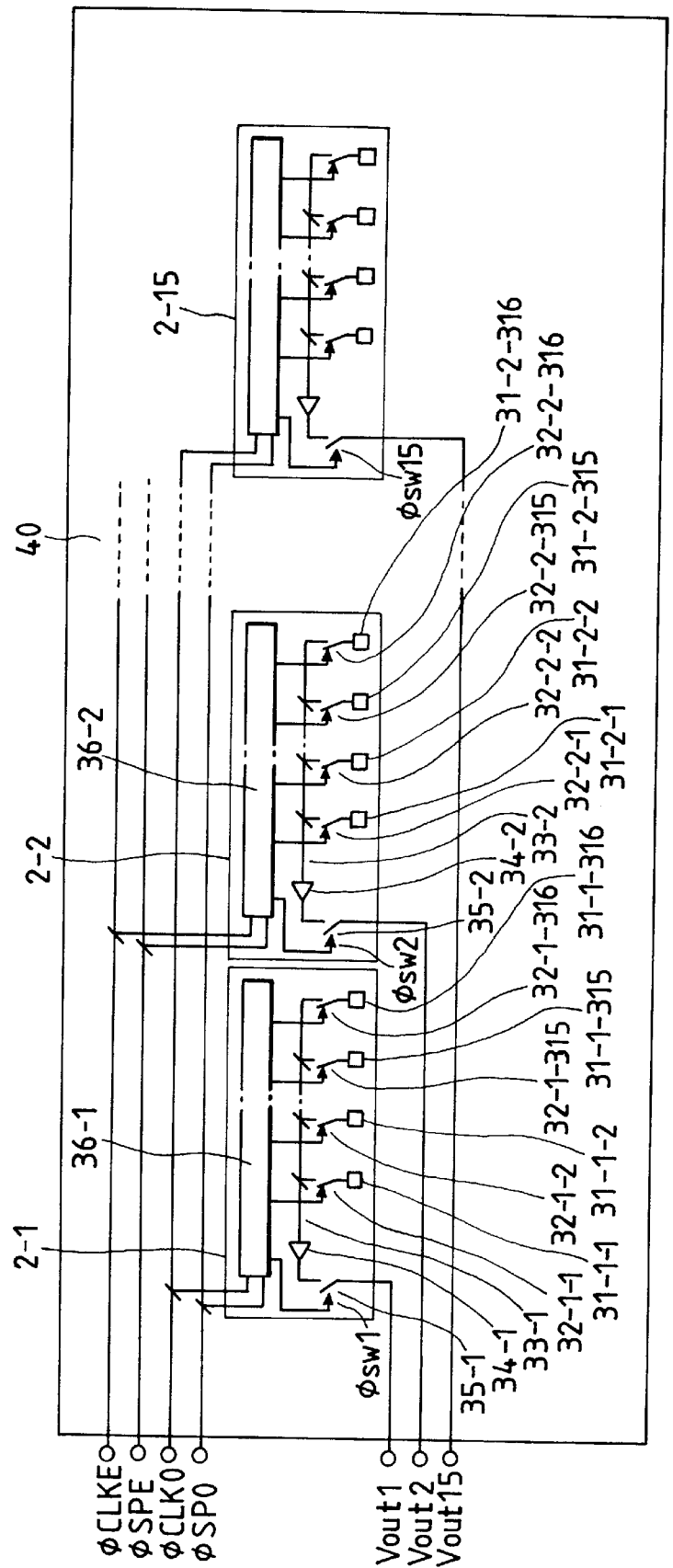
FIG. 15 is a constructional diagram of a sensor board according to the fourth embodiment.

FIG. 15 is a diagram showing wirings on a board 40 on which the sensor array 1 is installed in the fourth embodiment of the invention. In the diagram, the line sensors 2-1, 2-2, . . . , and 2-15 are substantially the same as those in the conventional apparatus. The wirings on the board 40 can drive the odd-number designated line sensors and the even-number designated line sensors at different timings. A first start pulse φSP0 to start the operations of the line sensors and a first clock pulse φCLK0 to drive the line sensors are inputted to only the odd-number designated line sensors 2-1, 2-3, . . . , and 2-15. A second start pulse φSPE to start the operations of the line sensors and a second clock pulse φCLKE to drive the line sensors are inputted to only the even-number designated line sensors 2-2, 2-4, ..., and 2-14. In a manner similar to the third embodiment, the output terminals Vout1 to Vout15 as many as the number of line sensors are also prepared on the board 40 to connect the signal outputs of the line sensors and are connected to the output terminals of the respective line sensors, respectively.

Figure 16:
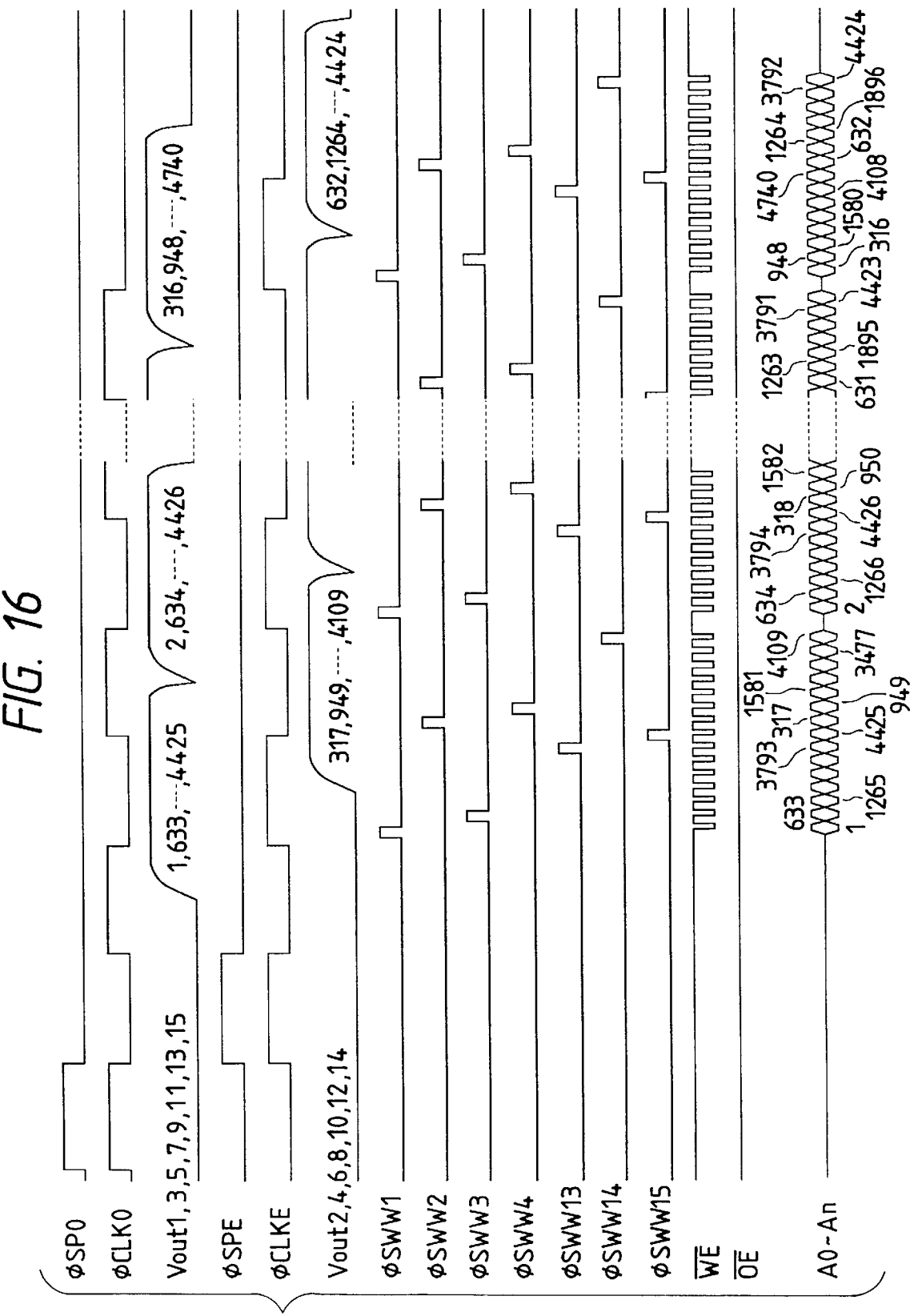
FIG. 16 is a timing chart for reading an image in the fourth embodiment.

The operation of the contact type multi-chip image sensor in which the output terminals Vout1 to Vout15 on the board 40 in FIG. 15 are connected to the digital signal output circuit of FIG. 12 will now be described with reference to a timing chart of FIG. 16.

First, the odd-number designated line sensors 2-1, 2-3, ..., and 2-15 simultaneously start the operations by the first start pulse φSP0 and the first clock pulse φCLK0. The odd-number designated switches 35-1, 35-3, ..., and 35-15 at the output stages of the line sensors 2-1, 2-3, ..., and 2-15 are conducting by the control signals φsw1, φsw3, ..., and φsw15 for a period of time during which the line sensors 2-1, 2-3, ..., and 2-15 are generating the signals. Therefore, the signals accumulated in the first photosensitive elements of the odd-number designated line sensors 2-1, 2-3, ..., and 2-15 are generated to the output terminals Vout1, Vout3, ..., and Vout15, respectively.

By the second start pulse φSPE and the second clock pulse φCLKE, the even-number designated line sensors 2-2, 2-4, ..., and 2-14 simultaneously start the operations with a delay time of the half period of the first clock pulse φCLK0 from the odd-number designated line sensors 2-1, 2-3, ..., and 2-15. The even-number designated switches 35-2, 35-4, ..., and 35-14 at the output stages in the line sensors 2-2, 2-4, ..., and 2-14 are conducting by the control signals φsw2, φsw4, ..., and φsw14 for a period of time during which the line sensors 2-2, 2-4, ..., and 2-14 are generating the signals. Therefore, the signals accumulated in the first photosensitive elements of the even-number designated line sensors 2-2, 2-4, ..., and 2-14 are generated to the output terminals Vout2, Vout4, ..., and Vout14, respectively.

As mentioned above, while the signals of the line sensors are being read out, in the digital signal output circuit shown in FIG. 12, the switches 46-1, 46-3, ..., 46-15, 46-2, 46-4, ..., and 46-14 are sequentially turned on or off one by one by the control signals φSWW1 to φSWW15, so that the signals outputted to Vout1 to Vout15 are connected to the analog input terminals of the A/D converter 41, respectively. The digital signals are stored into predetermined addresses in the memory 42 by the address signals A0 to An and the write enable signal $\overline{WE}$, respectively.

After the delay time of the half period of the clock pulses φCLK0 and φCLKE from the reading operation of the first photosensitive elements of the even-number designated line sensors 2-2, 2-4, ..., and 2-14, the odd-number designated line sensors 2-1, 2-3, ..., and 2-15 generate the signals accumulated in the second photosensitive elements to the output terminals Vout1, Vout3, ..., and Vout15, respectively. Further, after the delay time of the half period of the clock pulse φCLK0 and φCLKE from the above operations, the even-number designated line sensors 2-2, 2-4, ..., and 2-14 generate the signals accumulated in the second photosensitive elements to the output terminals Vout2, Vout4, ..., and Vout14, respectively.

By repeating such a series of operations, the signals accumulated in all of the photosensitive elements on the sensor array 1 can be read out in almost the reading time of one chip of the conventional apparatus and are written as digital signals into the predetermined addresses on the memory 42.

Figure 14:
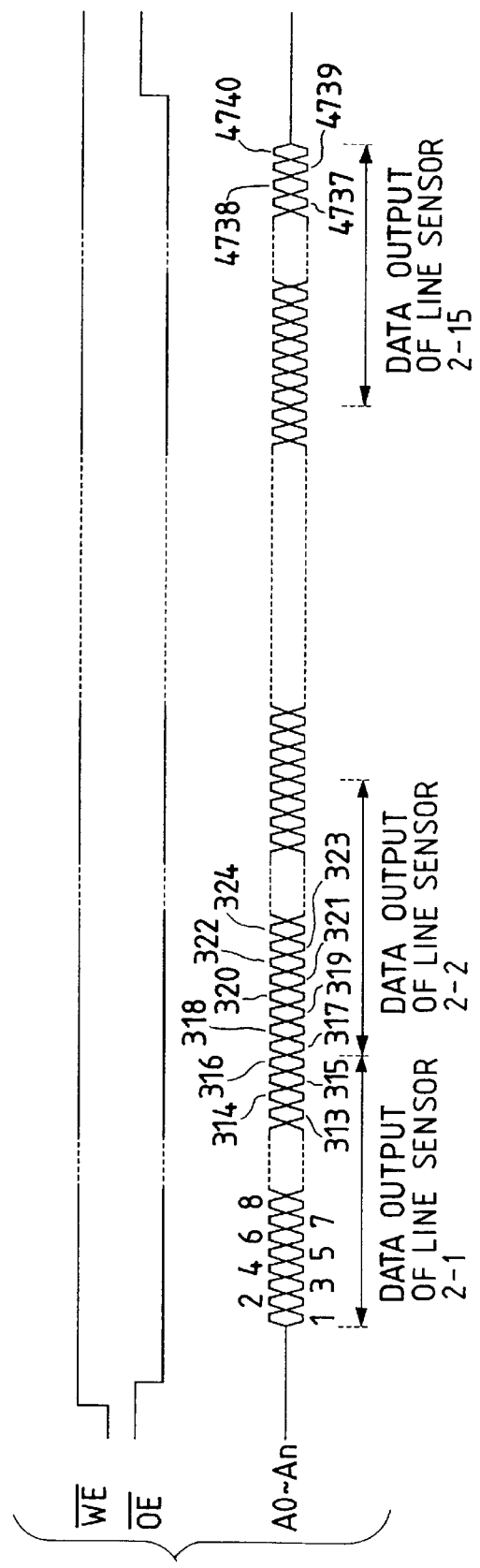
FIG. 14 is a timing chart for reading out image data from a memory in the third embodiment.

The operations for extracting the digital signals from the memory 42 are substantially the same as those in the third embodiment and are executed in accordance with a timing chart shown in FIG. 14.

After completion of the reading operations of the signals of all of the photosensitive elements, the digital signals stored in the memory 42 can be read out by the output enable signal $\overline{OE}$. The output terminals of the memory 42 are directly connected to the common digital output terminal Dout. Only by switching the address signals A0 to An at a proper timing, the digital signals corresponding to the photosensitive elements on the sensor array 1 can be sequentially read out at a high speed in accordance with the arrangement order on the sensor array 1.

As mentioned above, there are repeated the operations such that a plurality of line sensors constructing the sensor array are driven by respectively shifting the phases by only the half period of the reading time of one photosensitive element for the odd-number designated line sensors and the even-number designated line sensors, the signals generated from the odd-number designated line sensors are first A/D converted one by one and are sequentially written into the memory, the signals generated from the even-number designated line sensors are subsequently A/D converted one by one and are sequentially written into the memory. Thus, the signals of the photosensitive elements can be efficiently shifted into the memory by the circuit of a small scale without being influenced by the leading edge, trailing edge, or the like of the signal output in the signal reading operations from the photosensitive elements.

By extracting the signals of all of the photosensitive elements from the memory as digital signals at a high speed in accordance with the arrangement order on the sensor array, the reading and outputting operations of the signals of the sensor array can be executed totally in a short time.

Figure 17:
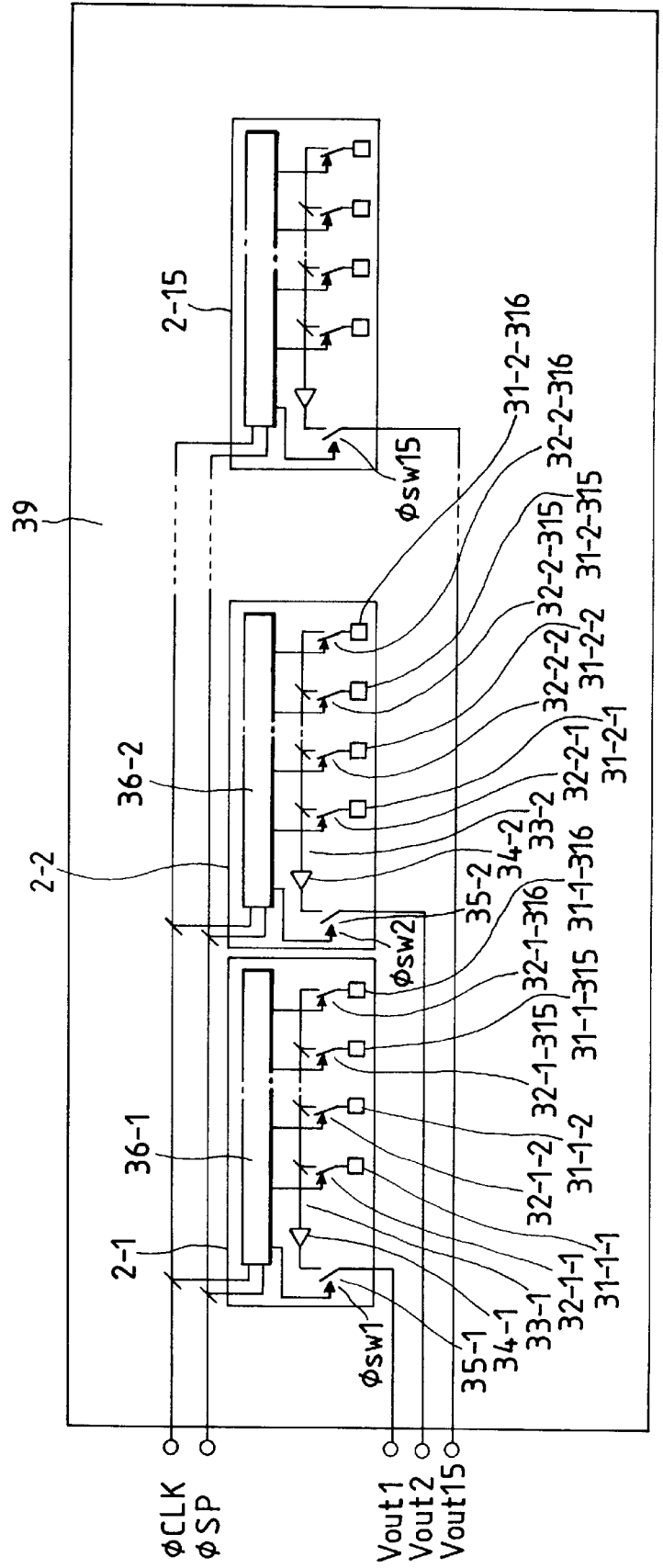
FIG. 17 is a constructional diagram of a sensor board according to the fifth embodiment.

FIG. 17 is a diagram showing wirings on the board 39 on which the sensor array 1 is installed in a contact type multi-chip image sensor as an image reading apparatus according to the fifth embodiment of the invention. In the diagram, the line sensors 2-1, 2-2, ..., and 2-15 are substantially the same as those in the conventional apparatus. However, the wirings on the board 39 on which the sensor array 1 is installed are different from the wirings on the board 19 in the conventional apparatus in FIG. 4 and simultaneously drive the line sensors, thereby enabling the signal outputs to be independently extracted.

Specifically speaking, the start pulse φSP to start the operations of the line sensors is directly inputted to all of the line sensors 2-1, 2-2, ..., and 2-15. The output terminals Vout1 to Vout15 as many as the number of line sensors are also prepared on the board 39 to connect the signal outputs of the line sensors and are connected to the output terminals of the line sensors, respectively.

Figure 18:
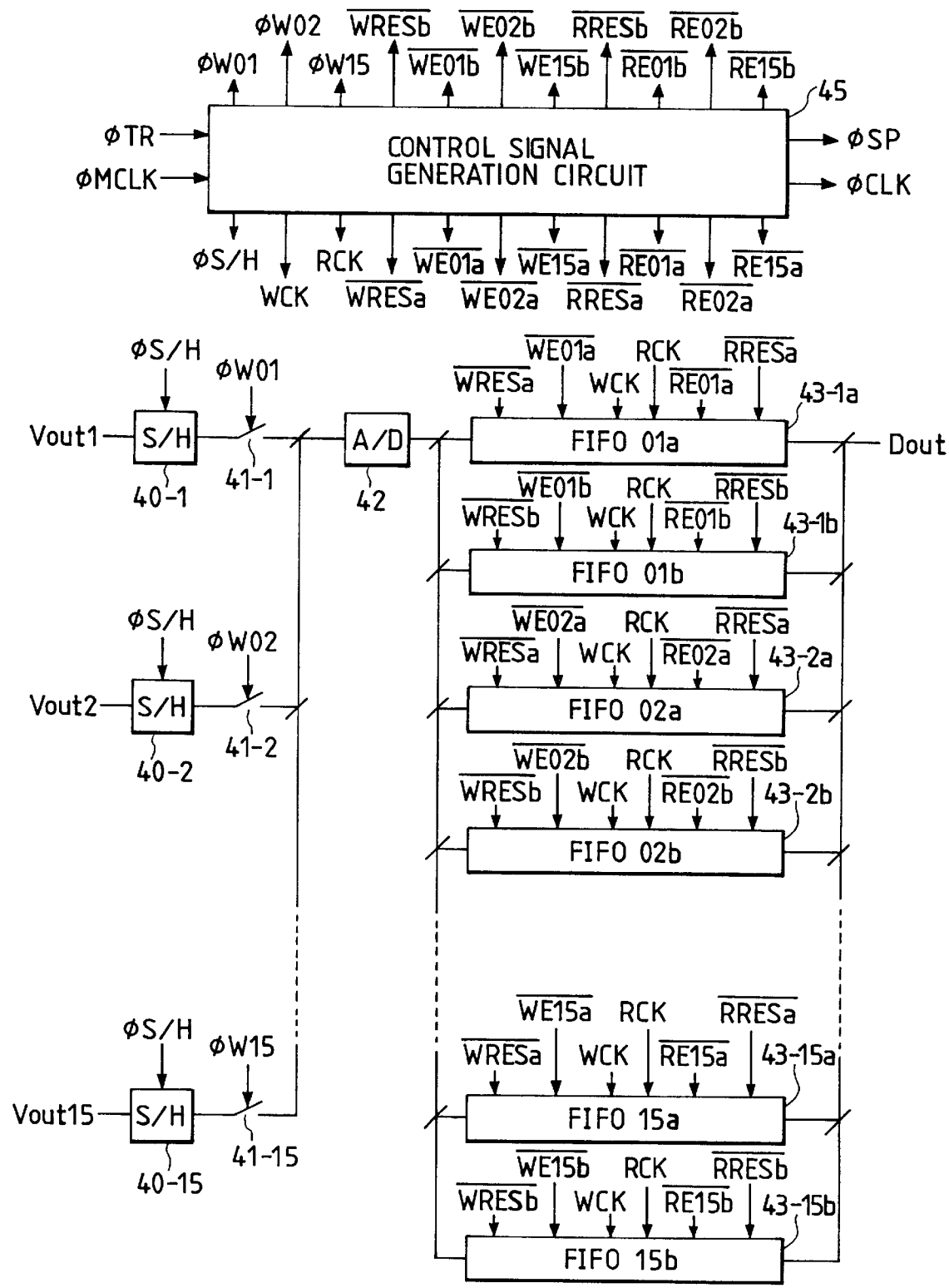
FIG. 18 is a constructional diagram of a digital output circuit in the fifth embodiment.

A digital signal output circuit which is connected to the board 39 has a construction as shown in FIG. 18. In the diagram, reference numerals 40-1, 40-2, ..., and 40-15 denote sample and hold (S/H) circuits for sampling and holding analog output signals of the line sensors 2-1, 2-2, ..., and 2-15 generated to the output terminals Vout1 to Vout15 at a predetermined timing; 42 an A/D converter for converting the signals which were sampled and held into the digital signals; 41-1, 41-2, ..., and 41-15 switches for controlling the connections between the signals of the line sensors 2-1, 2-2, ..., and 2-15 which were sampled and held and the input of the A/D converter 42; 43-1a, 43-1b, 43-2a, 43-2b, 43-15a, and 43-15b FIFO (First-In First-Out) memories serving as memory means for temporarily storing the signals read by the line sensors 2-1, 2-2, . . . , and 2-15; φS/H a control signal to decide the timings to sample and hold the analog output signals of the line sensors 2-1, 2-2, . . . , and 2-15 which were generated to the output terminals Vout1 to Vout15; φW01 to φW15 control signals for controlling the on/off operations of the switches 41-1, 41-2, . . . , and 41-15; $\overline{WRESa}$ a control signal for resetting write address counters of the FIFO memories 43-1a, 43-2a, . . . , and 43-15a serving as first memory areas; $\overline{WRESb}$ a control signal for resetting write address counters of the FIFO memories 43-1b, 43-2b, . . . , and 43-15b serving as second memory areas; $\overline{RRESa}$ a control signal for resetting read address counters of the FIFO memories 43-1a, 43-2a, and 43-15a; $\overline{RRESb}$ a control signal for resetting read address counters of the FIFO memories 43-1b, 43-2b, . . . , and 43-15b; $\overline{WE01a}, \overline{WE01b}, \overline{WE02a}, \overline{WE02b}, \ldots, \overline{WE15a},$ and $\overline{WE15b}$ control signals serving as write enable signals for enabling the data to be inputted into the FIFO memories 43-1a, 43-1b, 43-2a, 43-2b, 43-15a, and 43-15b; $\overline{RE01a}, \overline{RE01b}, \overline{RE02a}, \overline{RE02b}, \overline{RE15a},$ and $\overline{RE15b}$ read enable signals for enabling the data to be outputted from the FIFO memories 43-1a, 43-1b, 43-2a, 43-2b, . . . , 43-15a, and 43-15b; WCK a control signal for deciding a timing to write the data into the FIFO memories 43-1a, 43-1b, 43-2a, 43-2b, . . . , 43-15a, and 43-15b and a timing to increase a count value of the write address counter; RCK a control signal for deciding a timing to read out the data from the FIFO memories 43-1a, 43-1b, 43-2a, 43-2b, . . . , 43-15a, and 43-15b and a timing to increase a count value of the read address counter; and 45 a control signal generation circuit as control means for generating the start pulse φSP and clock pulse φCLK to drive the sensor array and various control signals in the digital signal output circuit from the original reading operation start signal φTR and master clock pulse φMCLK (not shown in timing charts of FIGS. 19 and 20, which will be explained hereinlater).

Figure 19:
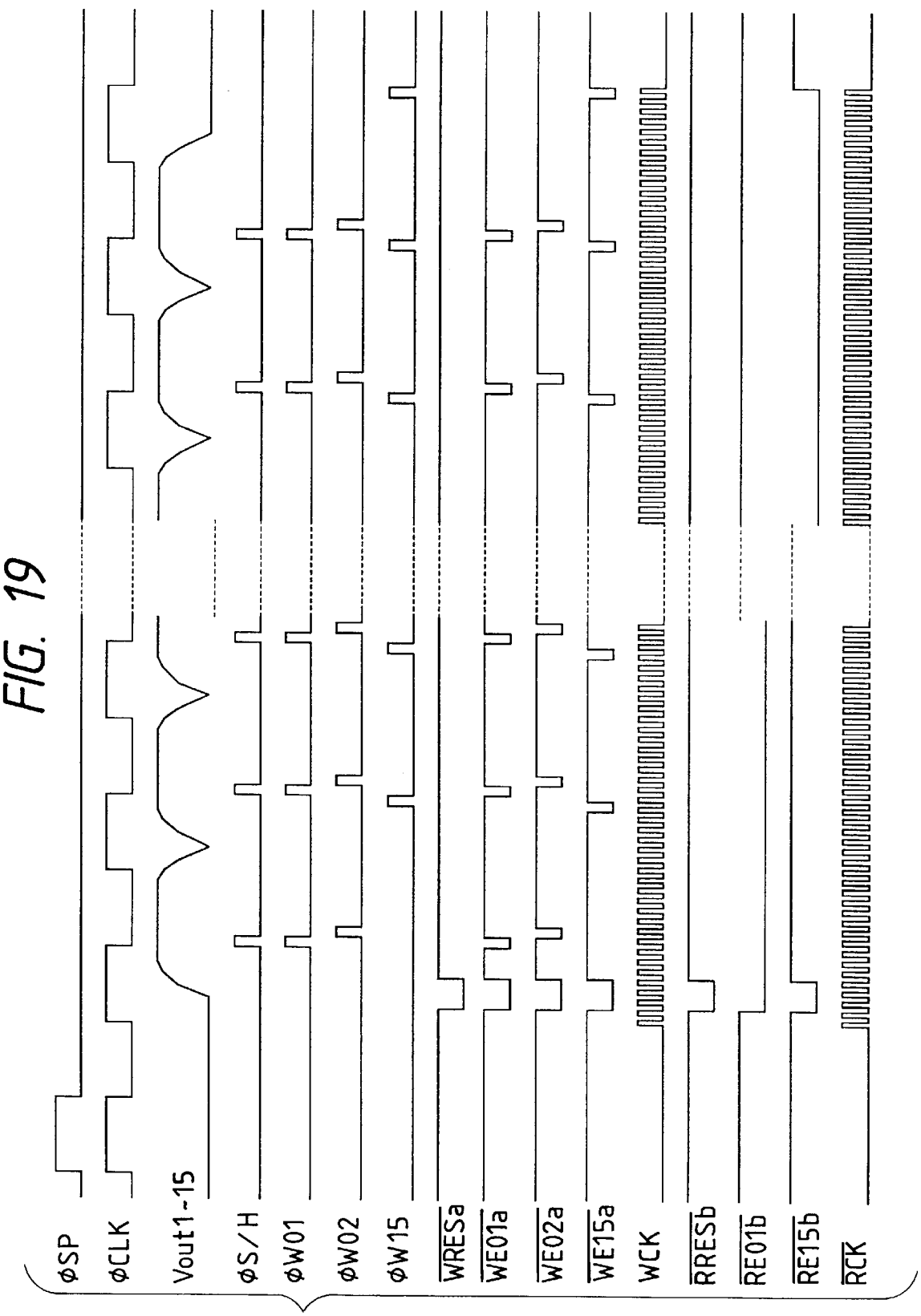
FIG. 19 is a timing chart for reading an image in the fifth embodiment.

The operation of a contact type multi-chip image sensor of the embodiment in which the wirings on the board are changed as shown in FIG. 17 and the digital signal output circuit of FIG. 18 is connected will now be described with reference to a timing chart of FIG. 19.

First, the reading operation of the original is started by the original reading operation start signal φTR. The original image is read every line while moving the contact type multi-chip image sensor by a distance of one line of the original. In the reading of one line, all of the line sensors 2-1, 2-2, . . . , and 2-15 simultaneously start the operations by the start pulse φSP as an output signal of the control signal generation circuit 45. The switches 35-1, 35-2, . . . , and 35-15 at the output stages in the line sensors 2-1, 2-2, . . . , and 2-15 are conducting by control signals φsw1, φsw2, . . . , and φsw15 while the line sensors 2-1, 2-2, . . . , and 2-15 are generating the signals, so that the line sensors sequentially transmit the signals accumulated in the photosensitive elements to the output terminals Vout1 to Vout15, respectively.

First, the signals of the first photosensitive elements of the line sensors, namely, the 1st, 317th, . . . , and 4425th photosensitive elements are simultaneously generated to the output terminal Vout. Subsequently, the signals of the 2nd, 318th, . . . , and 4426th photosensitive elements are generated to the output terminal Vout. In a manner similar to the above, the signals of the photosensitive elements in the respective line sensors are sequentially read out. Finally, the signals of the 316th, 632nd, . . . , and 4740th photosensitive elements are read out.

While the signals of all of the line sensors are being read out, in the digital signal output circuit shown in FIG. 18, the signals outputted to Vout1 to Vout15 are sampled and held at the timing that is decided by the control signal φS/H. The switches 41-1, 41-2, . . . , and 41-15 are sequentially turned on or off at the timings which are determined by the control signals φW01 to φW15. In a state in which the signals of the photosensitive elements have sufficiently been read out, the output signals are connected to the A/D converter 42 and are converted to the digital signals. In this manner, while the line sensors 2-1, 2-2, . . . , and 2-15 are generating the signals as much as one photosensitive element, the signals of the photosensitive elements at the same position of all of the line sensors 2-1, 2-2, . . . , and 2-15 are sequentially generated as digital signals from the line sensor 2-1 to the output terminal of the A/D converter 42.

The digital signals as many as the number of line sensors derived as mentioned above are written into the different FIFO memories with respect to the odd-number designated lines and the even-number designated lines after the start of the reading operation of the original. First, in the odd-number designated lines, as shown in the timing chart of FIG. 19, the write address counters of the FIFO memories 43-1a, 43-2a, . . . , and 43-15a are reset by the control signal $\overline{WRESa}, \overline{WE01a}, \overline{WE02a}, \ldots, \overline{WE15a},$ and WCK. Subsequently, the output signals of the line sensors as digital signals are sequentially written into the FIFO memories 43-1a, 43-2a, . . . , and 43-15a by the control signals $\overline{WE01a}, \overline{WE02a}, \ldots, \overline{WE15a}$ synchronized with the control signals φW01 to φW15.

At the same time, the read address counters of the FIFO memories 43-1b, 43-2b, . . . , and 43-15b are reset by the control signals $\overline{RRESb}, \overline{RE01b}, \overline{RE02b}, \ldots, \overline{RE15b},$ and RCK. Subsequently, the signals of the previous line which have already been written in the FIFO memories 43-1b, 43-2b, . . . , and 43-15b by the control signals $\overline{WE01b}, \overline{WE02b}, \ldots,$ and $\overline{WE15b}$ are read out to the digital output terminal Dout every line sensor in accordance with the arrangement order of the photosensitive elements on the sensor array 1 from the signal of the line sensor 2-1 held in the FIFO memory 43-1b. Although not shown in FIG. 19, each of the control signals $\overline{WRESb}, \overline{WE01b}, \overline{WE02b}, \ldots, \overline{WE15b}, \overline{RRESa}, \overline{RE01a}, \overline{RE02a}, \ldots,$ and $\overline{RE15a}$ is at the H level.

Figure 20:
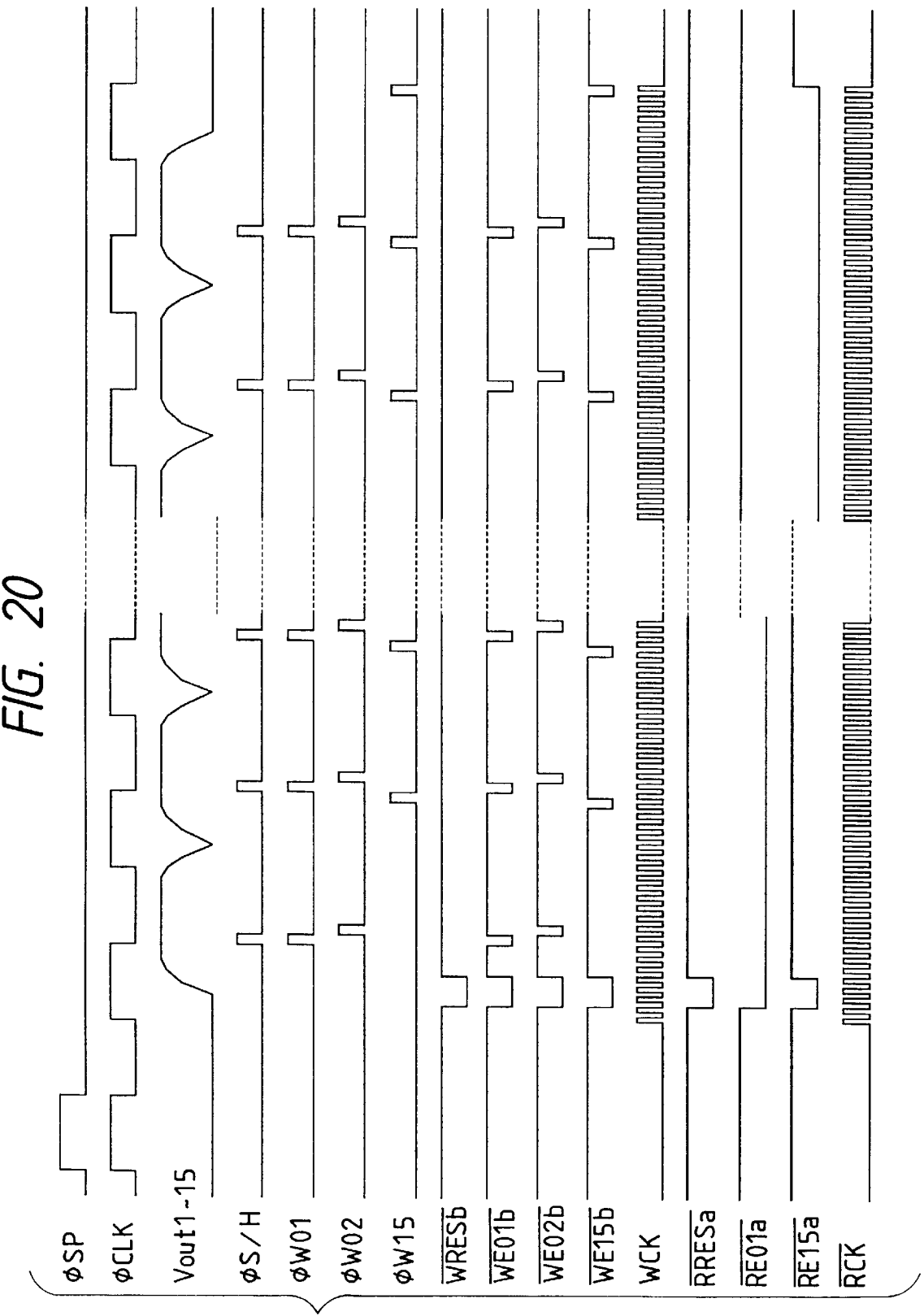
FIG. 20 is a timing chart for reading an image in the fifth embodiment.

In the operations in the even-number designated lines, as shown in a timing chart of FIG. 20, the signals are written into the FIFO memories 43-1b, 43-2b, . . . , and 43-15b by the control signals $\overline{WRESb}, \overline{WE01b}, \overline{WE02b}, \ldots, \overline{WE15b},$ and WCK.

At the same time, the signals of the previous line which have already been written in the FIFO memories 43-1a, 43-2a, . . . , and 43-15a by the control signals $\overline{RRESa}, \overline{RE01a}, \overline{RE02a}, \ldots, \overline{RE15a},$ and RCK are read out to the digital output terminal Dout every line sensor in accordance with the arrangement order of the photosensitive elements on the sensor array 1 from the signal of the line sensor 2-1 held in the FIFO memory 43-1a. Although not shown in FIG. 20, each of the control signals $\overline{WRESa}, \overline{WE01a}, \overline{WE02a}, \ldots, \overline{WE15a}, \overline{RRESb}, \overline{RE01b}, \overline{RE02b}, \ldots,$ and $\overline{RE15b}$ is at the H level.

In accordance with the above procedure, the line sensors constructing the sensor array 1 are simultaneously driven, the outputs of the line sensors generated onto the board are once stored into the FIFO memories of two systems corresponding to the odd-number designated lines and the even-number designated lines, and at the same time, the data in the FIFO memories to which the data writing operation is not performed, namely, in which the data has already been written is outputted to the outside. Thus, the reading operation of the signals from the sensor array is completed in a short time. The signal reading operation from the sensor array, the data writing operation into the memory, and the data reading operation from the memory can be simultaneously executed. The high speed operation of the image sensor can be easily realized by using the conventional line sensor without accomplishing a high operating speed of the output amplifier in the line sensor.

In the embodiment, since the outputs of the line sensors which were extracted in parallel are sampled at the same timing and are A/D converted, unevenness doesn't occur among the output levels of the line sensors. Although the costs of the contact type multi-chip image sensor are more and more reduced and a necessity to use cheap parts is rising in recent years, even if the clock pulse or the like leaks to the output line on the board, by sampling the analog signals by a different circuit, the signals are hardly influenced. There is also an advantage such that a cheap board can be used.

What is claimed is:

1. An image reading apparatus comprising:
   a plurality of sensors for converting pickup light into electrical signals, each of said plurality of sensors being provided on a separate chip;
   a board on which said plurality of sensors is arranged,
   wherein each of said plurality of sensors includes light-receiving elements, an amplifier connected to said plurality of light-receiving elements in common and adapted to sequentially read out electrical signals from said plurality of light-receiving elements, and a signal switch adapted to read out a signal from the amplifier,
   wherein said board includes a first signal line for reading out electrical signals from a first sensor included in said plurality of sensors, and a second signal line for reading out electrical signals from a second sensor included in said plurality of sensors, each of the first and second signal lines being connected to respective ones of the amplifiers through respective ones of the signal switches, and being arranged where said plurality of sensors are not positioned; and
   a driving circuit adapted to drive the first and second sensors,
   wherein said driving circuit drives the first and second sensors of said plurality of sensors so that the signal switches included respectively in the first and second sensors are opened after an elapse of predetermined time from reception of a start signal for starting an operation of the respective sensor, and to drive the first and second sensors so as to read out the signal from one of the plurality of light-receiving elements included in the first sensor of said plurality of sensors through the respective amplifier, subsequently read out the signal from one of the plurality of light-receiving elements included in the second sensor of said plurality of sensors through the respective amplifier, and subsequently read out the signal from another one of the plurality of light-receiving elements included in the first sensor through the respective amplifier, and
   wherein said driving circuit differentiates a timing when the signal from the first sensor is read out through the respective amplifier, and a timing when the signal from the second sensor is read out through the respective amplifier.

2. An apparatus according to claim, 1, further comprising:
   a memory, arranged to store the output signals of said sensors; and
   a signal selector, arranged to selectively output the output signals of said memory.

3. An apparatus according to claim 1, further comprising:
   a holder, arranged to temporarily hold the output signals of said sensors;
   a signal selector, arranged to selectively output the signals held by said holder; and
   a memory, arranged to store the signal selected by said signal selector.

4. An apparatus according to claim 1, further comprising:
   analog-digital conversion means for converting respective image signals from said plurality of sensors;
   a memory adapted to store a signal from said analog-digital conversion means; and
   a controller adapted to effect control so as to alternately write a signal from said analog-digital conversion means into first and second memory areas of said memory while reading out a stored signal that is also output from said analog-digital conversion means, from the first and second memory areas of said memory in reverse order of the writing order.

5. An apparatus according to claim 4, wherein said controller controls so as to store the signals generated from the odd-number designated photosensitive elements among said plurality of sensors into one of said first and second memory areas in said memory and to store the signals read out from the odd number designated photosensitive elements among said plurality of sensors into the other memory area.

6. An apparatus according to claim 4, wherein said controller simultaneously drives said plurality of sensors.

7. An apparatus according to claim 4, wherein said memory is a First-In First-Out memory.

8. An apparatus according to claim 4, further comprising:
   a support table adapted to support an original;
   a light source adapted to illuminate said original; and
   a lens adapted to focus light reflected from said original onto said plurality of sensors.

9. An apparatus according to claim 1, further comprising:
   a support table adapted to support an original;
   a light source adapted to illuminate said original; and
   a lens adapted to focus light reflected from said original onto said plurality of sensors.

10. An apparatus according to claim 1, wherein said driving circuit supplies a clock pulse for driving said plurality of sensors, and wherein the respective signal switches are not opened during a time period from the reception of the start signal to the supply of at least a subsequent clock pulse.

11. An image reading apparatus comprising:
    a plurality of sensors for converting pickup light into electrical signals, each of said plurality of sensors being provided on a separate chip;
    a board on which said plurality of sensors is arranged;
    wherein each of said plurality of sensors includes light-receiving elements, an amplifier connected to said plurality of light-receiving elements in common and adapted to sequentially read out electrical signals from said plurality of light-receiving elements, and a signal switch adapted to read out a signal from the amplifier,
    wherein said board includes a first signal line for reading out electrical signals from a first sensor included in said plurality of sensors, and a second signal line for reading out electrical signals from a second sensor included in said plurality of sensors, each of the first and second signal lines being connected to respective ones of the amplifiers through respective ones of the signal switches, and being arranged where said plurality of sensors are not positioned; and a driving circuit adapted to drive the first and second sensors, wherein said driving circuit drives the first and second sensors of said plurality of sensors so that the signal switches included respectively in the first and second sensors are opened after an elapse of predetermined time from reception of a start signal for starting an operation of the respective sensor, and to drive the first and second sensors so as to read out the signal from one of the plurality of light-receiving elements included in the first sensor of said plurality of sensors through the respective amplifier, subsequently read out the signal from one of the plurality of light-receiving elements included in the second sensor of said plurality of sensors through the respective amplifier, and subsequently read out the signal from another one of the plurality of light-receiving elements included in the first sensor through the respective amplifier, and wherein said driving circuit differentiates a timing when the signal from the first sensor is read out through the respective amplifier, and a timing when the signal from the second sensor is read out through the respective amplifier, wherein said sensor driving circuit effects control so as to mutually deviate the driving timings of the adjacent sensors among said plurality of sensors.

12. An image reading apparatus comprising:

a plurality of sensors for converting pickup light into electrical signals, each of said plurality of sensors being provided on a separate chip;

a board on which said plurality of sensors is arranged;

wherein each of said plurality of sensors includes light-receiving elements, an amplifier connected to said plurality of light-receiving elements in common and adapted to sequentially read out electrical signals from said plurality of light-receiving elements, and a signal switch adapted to read out a signal from the amplifier, wherein said board includes a first signal line for reading out electrical signals from a first sensor included in said plurality of sensors, and a second signal line for reading out electrical signals from a second sensor included in said plurality of sensors, each of the first and second signal lines being connected to respective ones of the amplifiers through respective ones of the signal switches, and being arranged where said plurality of sensors are not positioned; and a driving circuit adapted to drive the first and second sensors, wherein said driving circuit drives the first and second sensors of said plurality of sensors so that the signal switches included respectively in the first and second sensors are opened after an elapse of predetermined time from reception of a start signal for starting an operation of the respective sensor, and to drive the first and second sensors so as to read out the signal from one of the plurality of light-receiving elements included in the first sensor of said plurality of sensors through the respective amplifier, subsequently read out the signal from one of the plurality of light-receiving elements included in the second sensor of said plurality of sensors through the respective amplifier, and subsequently read out the signal from another one of the plurality of light-receiving elements included in the first sensor through the respective amplifier, and wherein said driving circuit differentiates a timing when the signal from the first sensor is read out through the respective amplifier, and a timing when the signal from the second sensor is read out through the respective amplifier, wherein said sensor driving circuit effects control so as to mutually deviate the driving timings of the adjacent sensors among said plurality of sensors, and wherein said sensor driving circuit effects control so as to deviate the driving timing of the odd-number designated sensors among said plurality of sensors relative to the driving timing of the even-number designated sensors.

13. An image reading apparatus comprising:

a plurality of sensors for converting pickup light into electrical signals, each of said plurality of sensors being provided on a separate chip;

a board on which said plurality of sensors is arranged;

wherein each of said plurality of sensors includes light-receiving elements, an amplifier connected to said plurality of light-receiving elements in common and adapted to sequentially read out electrical signals from said plurality of light-receiving elements, and a signal switch adapted to read out a signal from the amplifier, wherein said board includes a first signal line for reading out electrical signals from a first sensor included in said plurality of sensors, and a second signal line for reading out electrical signals from a second sensor included in said plurality of sensors, each of the first and second signal lines being connected to respective ones of the amplifiers through respective ones of the signal switches, and being arranged where said plurality of sensors are not positioned; and a driving circuit adapted to drive the first and second sensors, wherein said driving circuit drives the first and second sensors of said plurality of sensors so that the signal switches included respectively in the first and second sensors are opened after an elapse of predetermined time from reception of a start signal for starting an operation of the respective sensor, and to drive the first and second sensors so as to read out the signal from one of the plurality of light-receiving elements included in the first sensor of said plurality of sensors through the respective amplifier, subsequently read out the signal from one of the plurality of light-receiving elements included in the second sensor of said plurality of sensors through the respective amplifier, and subsequently read out the signal from another one of the plurality of light-receiving elements included in the first sensor through the respective amplifier, and wherein said driving circuit differentiates a timing when the signal from the first sensor is read out through the respective amplifier, and a timing when the signal from the second sensor is read out through the respective amplifier, wherein said sensor driving circuit effects control so as to mutually deviate the driving timings of the adjacent sensors among said plurality of sensors, and wherein a deviation of said driving timing is equal to a time obtained by dividing a reading period of the pixel element by the number of sensors.

14. An image reading apparatus comprising:

a plurality of sensors for converting pickup light into electrical signals, each of said plurality of sensors being provided on a separate chip;

a board on which said plurality of sensors is arranged;

wherein each of said plurality of sensors includes light-receiving elements, an amplifier connected to said plurality of light-receiving elements in common and adapted to sequentially read out electrical signals from said plurality of light-receiving elements, and a signal switch adapted to read out a signal from the amplifier, wherein said board includes a first signal line for reading out electrical signals from a first sensor included in said plurality of sensors, and a second signal line for reading out electrical signals from a second sensor included in said plurality of sensors, each of the first and second signal lines being connected to respective ones of the amplifiers through respective ones of the signal switches, and being arranged where said plurality of sensors are not positioned; and a driving circuit adapted to drive the first and second sensors, wherein said driving circuit drives the first and second sensors of said plurality of sensors so that the signal switches included respectively in the first and second sensors are opened after an elapse of predetermined time from reception of a start signal for starting an operation of the respective sensor, and to drive the first and second sensors so as to read out the signal from one of the plurality of light-receiving elements included in the first sensor of said plurality of sensors through the respective amplifier, subsequently read out the signal from one of the plurality of light-receiving elements included in the second sensor of said plurality of sensors through the respective amplifier, and subsequently read out the signal from another one of the plurality of light-receiving elements included in the first sensor through the respective amplifier, and wherein said driving circuit differentiates a timing when the signal from the first sensor is read out through the respective amplifier, and a timing when the signal from the second sensor is read out through the respective amplifier, wherein said sensor driving circuit effects control so as to mutually deviate the driving timings of the adjacent sensors among said plurality of sensors, and wherein said sensor driving circuit effects control so as to deviate the driving timing of the odd-number designated sensors among said plurality of sensors relative to the driving timing of the even-number designated sensors, and wherein a deviation of said driving timing is equal to a time obtained by dividing a reading period of the pixel element by the number of sensors.

15. An image reading apparatus comprising:

a plurality of sensors for converting pickup light into electrical signals, each of said plurality of sensors being provided on a separate chip;

a board on which said plurality of sensors is arranged;

wherein each of said plurality of sensors includes light-receiving elements, an amplifier connected to said plurality of light-receiving elements in common and adapted to sequentially read out electrical signals from said plurality of light-receiving elements, and a signal switch adapted to read out a signal from the amplifier, wherein said board includes a first signal line for reading out electrical signals from a first sensor included in said plurality of sensors, and a second signal line for reading out electrical signals from a second sensor included in said plurality of sensors, each of the first and second signal lines being connected to respective ones of the amplifiers through respective ones of the signal switches, and being arranged where said plurality of sensors are not positioned; and a driving circuit adapted to drive the first and second sensors, wherein said driving circuit drives the first and second sensors of said plurality of sensors so that the signal switches included respectively in the first and second sensors are opened after an elapse of predetermined time from reception of a start signal for starting an operation of the respective sensor, and to drive the first and second sensors so as to read out the signal from one of the plurality of light-receiving elements included in the first sensor of said plurality of sensors through the respective amplifier, subsequently read out the signal from one of the plurality of light-receiving elements included in the second sensor of said plurality of sensors through the respective amplifier, and subsequently read out the signal from another one of the plurality of light-receiving elements included in the first sensor through the respective amplifier, and wherein said driving circuit differentiates a timing when the signal from the first sensor is read out through the respective amplifier, and a timing when the signal from the second sensor is read out through the respective amplifier, wherein said sensor driving circuit effects control so as to mutually deviate the driving timings of the adjacent sensors among said plurality of sensors, and wherein the deviation of said driving timing is equal to half of a reading period of the pixel element.

16. An image reading apparatus comprising:

a plurality of sensors for converting pickup light into electrical signals, each of said plurality of sensors being provided on a separate chip;

a board on which said plurality of sensors is arranged;

wherein each of said plurality of sensors includes light-receiving elements, an amplifier connected to said plurality of light-receiving elements in common and adapted to sequentially read out electrical signals from said plurality of light-receiving elements, and a signal switch adapted to read out a signal from the amplifier, wherein said board includes a first signal line for reading out electrical signals from a first sensor included in said plurality of sensors, and a second signal line for reading out electrical signals from a second sensor included in said plurality of sensors, each of the first and second signal lines being connected to respective ones of the amplifiers through respective ones of the signal switches, and being arranged where said plurality of sensors are not positioned; and a driving circuit adapted to drive the first and second sensors, wherein said driving circuit drives the first and second sensors of said plurality of sensors so that the signal switches included respectively in the first and second sensors are opened after an elapse of predetermined time from reception of a start signal for starting an operation of the respective sensor, and to drive the first and second sensors so as to read out the signal from one of the plurality of light-receiving elements included in the first sensor of said plurality of sensors through the respective amplifier, subsequently read out the signal from one of the plurality of light-receiving elements included in the second sensor of said plurality of sensors through the respective amplifier, and subsequently read out the signal from another one of the plurality of light-receiving elements included in the first sensor through the respective amplifier, and wherein said driving circuit differentiates a timing when the signal from the first sensor is read out through the respective amplifier, and a timing when the signal from the second sensor is read out through the respective amplifier, wherein said sensor driving circuit effects control so as to mutually deviate the driving timings of the adjacent sensors among said plurality of sensors, and wherein said sensor driving circuit effects control so as to deviate the driving timing of the odd-number designated sensors among said plurality of sensors relative to the driving timing of the even-number designated sensors, and wherein the deviation of said driving timing is equal to half of a reading period of the pixel element.

17. An image reading apparatus comprising:

a plurality of sensors for converting pickup light into electrical signals, each of said plurality of sensors being provided on a separate chip;

a board on which said plurality of sensors is arranged;

wherein each of said plurality of sensors includes light-receiving elements, an amplifier connected to said plurality of light-receiving elements in common and adapted to sequentially read out electrical signals from said plurality of light-receiving elements, and a signal switch adapted to read out a signal from the amplifier, wherein said board includes a first signal line for reading out electrical signals from a first sensor included in said plurality of sensors, and a second signal line for reading out electrical signals from a second sensor included in said plurality of sensors, each of the first and second signal lines being connected to respective ones of the amplifiers through respective ones of the signal switches, and being arranged where said plurality of sensors are not positioned; and a driving circuit adapted to drive the first and second sensors, wherein said driving circuit drives the first and second sensors of said plurality of sensors so that the signal switches included respectively in the first and second sensors are opened after an elapse of predetermined time from reception of a start signal for starting an operation of the respective sensor, and to drive the first and second sensors so as to read out the signal from one of the plurality of light-receiving elements included in the first sensor of said plurality of sensors through the respective amplifier, subsequently read out the signal from one of the plurality of light-receiving elements included in the second sensor of said plurality of sensors through the respective amplifier, and subsequently read out the signal from another one of the plurality of light-receiving elements included in the first sensor through the respective amplifier, and wherein said driving circuit differentiates a timing when the signal from the first sensor is read out through the respective amplifier, and a timing when the signal from the second sensor is read out through the respective amplifier; and further comprising:

a signal selector, arranged to selectively output the output signals of said plurality of sensors; and a memory for storing the output signal of said signal selector, wherein said sensor driving circuit controls so as to sequentially read out the output signals of said sensors stored in said memory.

18. An image reading apparatus comprising:

a plurality of sensors for converting pickup light into electrical signals, each of said plurality of sensors being provided on a separate chip;

a board on which said plurality of sensors is arranged;

wherein each of said plurality of sensors includes a light-receiving element, an amplifier connected to said plurality of light-receiving elements in common and adapted to sequentially read out electrical signals from said plurality of light-receiving elements, and a signal switch adapted to read out a signal from the amplifier, wherein said board includes a first signal line for reading out electrical signals from a first sensor included in said plurality of sensors, and a second signal line for reading out electrical signals from a second sensor included in said plurality of sensors, each of the first and second signal lines being connected to respective ones of the amplifiers through respective ones of the signal switches, and being arranged where said plurality of sensors are not positioned; and a driving circuit adapted to drive the first and second sensors, wherein said driving circuit drives the first and second sensors of said plurality of sensors so that the signal switches included respectively in the first and second sensors are opened after an elapse of predetermined time from reception of a start signal for starting an operation of the respective sensor, and to drive the first and second sensors so as to read out the signal from one of the plurality of light-receiving elements included in the first sensor of said plurality of line sensors through the respective amplifier, subsequently read out the signal from one of the plurality of light-receiving elements included in the second sensor of said plurality of sensors through the respective amplifier, and subsequently read out the signal from another one of the plurality of light-receiving elements included in the first sensor through the respective amplifier, and wherein said driving circuit differentiates a timing when the signal from the first sensor is read out through the respective amplifier, and a timing when the signal from the second sensor is read out through the respective amplifier; and further comprising:

a support table adapted to support an original;

a light source adapted to illuminate said original; and a lens adapted to focus light reflected from said original onto said plurality of sensors.

19. An image reading apparatus comprising:

a plurality of sensors for converting pickup light into electrical signals, each of said plurality of sensors being provided on a separate chip;

a board on which said plurality of sensors are arranged, wherein each of said plurality of sensors includes a plurality of light-receiving elements, an amplifier adapted to sequentially output electrical signals from said plurality of light-receiving elements, and a signal switch adapted to connect the amplifier to an output of said plurality of sensors, wherein said board includes a first signal line for reading out electrical signals from a first sensor included in said plurality of sensors, and a second signal line for reading out electrical signals from a second sensor included in said plurality of sensors, each of the first and second signal lines being connected to respective ones of the amplifiers through respective ones of the signal switches, and being arranged where said plurality of sensors are not positioned, and wherein the signal switches included respectively in the first and second sensors are opened after an elapse of a predetermined time from reception of a start signal for starting an operation of the respective sensor; and a driving circuit adapted to drive the first and second sensors so that respective driving periods of the first and second sensors overlap with each other.

wherein said driving circuit drives the first and second sensors so that signals from the first and second sensors are read out respectively to the first and second signal lines at a same time.

20. An apparatus according to claim 19, wherein said driving circuit supplies a clock pulse for driving said plurality of sensors, and wherein the respective signal switches are not opened during a time period from the reception of the start signal to the supply of at least a subsequent clock pulse.

21. An apparatus according to claim 19, further comprising:

analog-digital conversion means for converting respective image signals from said plurality of sensors;

a memory adapted to store a signal from said analog-digital conversion means; and a controller adapted to effect control so as to alternately write a signal from said analog-digital conversion means into first and second memory areas of said memory while reading out a stored signal that is also output from said analog-digital conversion means, from the first and second memory areas of said memory in reverse order of the writing order.

* * * * *

UNITED STATES PATENT AND TRADEMARK OFFICE
CERTIFICATE OF CORRECTION

PATENT NO. : 6,539,129 B1
DATED : March 25, 2003
INVENTOR(S) : Akihiko Yushiya

It is certified that error appears in the above-identified patent and that said Letters Patent is hereby corrected as shown below:

Column 8,
Line 3, "enough" should read -- enough, --.

Column 10,
Line 11, "but," should read -- out, --.
Line 63, "ɸSP0" should read -- ɸSPO --; and
Line 64, "ɸCLK0" should read -- ɸCLKO --.

Column 11,
Line 1, "t o" should read -- to --;
Line 14, "ɸSP0" should read -- ɸSPO --; and "ɸCLK0" should read -- ɸCLKO --; and
Lines 27, 50 and 57, "ɸCLK0" should read -- ɸCLKO --.

Column 12,
Line 67, "43-2b," should read -- 43-2b, . . . , --.

Column 13,
Line 19, "43-2b," should read -- 43-2b, . . . , --; and "$\overline{RE02b}$," should read -- $\overline{RE02b}$, . . . , --; and Line 21, "431b," should read -- 43-1b, --.

Signed and Sealed this

Fourth Day of November, 2003

JAMES E. ROGAN
*Director of the United States Patent and Trademark Office*